United States Patent
Shilimkar et al.

(10) Patent No.: US 12,010,173 B2
(45) Date of Patent: Jun. 11, 2024

(54) CLASS-BASED QUEUEING FOR SCALABLE MULTI-TENANT RDMA TRAFFIC

(71) Applicant: Oracle International Corporation, Redwood Shores, CA (US)

(72) Inventors: Santosh Narayan Shilimkar, San Jose, CA (US); David Dale Becker, Seattle, WA (US); Jagwinder Singh Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/166,922

(22) Filed: Feb. 3, 2021

(65) Prior Publication Data

US 2022/0210225 A1    Jun. 30, 2022

Related U.S. Application Data

(60) Provisional application No. 63/132,417, filed on Dec. 30, 2020.

(51) Int. Cl.
*H04L 29/08* (2006.01)
*H04L 12/46* (2006.01)
(Continued)

(52) U.S. Cl.
CPC ...... *H04L 67/1097* (2013.01); *H04L 12/4645* (2013.01); *H04L 47/115* (2013.01);
(Continued)

(58) Field of Classification Search
CPC ..... H04L 47/10; H04L 69/08; H04L 2212/00; H04L 41/00; H04L 47/50; H04L 45/66; H04L 69/325
See application file for complete search history.

(56) References Cited

U.S. PATENT DOCUMENTS 6,963,576 B1 * 11/2005 Lee .................. H04L 47/20
370/414
7,415,035 B1    8/2008 Muller et al.
(Continued)

FOREIGN PATENT DOCUMENTS

CN         110022269      7/2019

OTHER PUBLICATIONS

International Application No. PCT/US2021/027069 , International Search Report and Written Opinion, dated Nov. 15, 2021, 16 pages.
(Continued)

*Primary Examiner* — Romani Ohri
(74) *Attorney, Agent, or Firm* — Kilpatrick Townsend & Stockton LLP

(57) ABSTRACT

Techniques and apparatus for data networking are described. In one example, a method of queuing Remote Direct Memory Access (RDMA) packets includes receiving a first RDMA packet having a first quality-of-service (QoS) data field; based on a value of the first QoS data field, queueing the first RDMA packet in a first queue of a plurality of queues; receiving a second RDMA packet having a second QoS data field; and based on a value of the second QoS data field, queueing the second RDMA packet in a second queue of the plurality of the queues, the second queue being different than the first queue.

21 Claims, 17 Drawing Sheets

(51) Int. Cl.
  H04L 47/11    (2022.01)
  H04L 47/2408  (2022.01)
  H04L 67/1097  (2022.01)
  H04L 67/61    (2022.01)
  H04L 69/22    (2022.01)
  H04L 69/325   (2022.01)

(52) U.S. Cl.
  CPC .......... H04L 47/2408 (2013.01); H04L 67/61 (2022.05); H04L 69/22 (2013.01); H04L 69/325 (2013.01); H04L 2212/00 (2013.01)

(56) References Cited

U.S. PATENT DOCUMENTS

| | | | |
|---|---|---|---|
| 8,824,293 B2 | 9/2014 | Assarpour et al. | |
| 9,712,440 B2 | 7/2017 | Koodli et al. | |
| 9,747,249 B2 | 8/2017 | Cherian et al. | |
| 10,177,936 B2 | 1/2019 | Banavalikar | |
| 10,887,131 B1 | 1/2021 | Chin et al. | |
| 11,042,496 B1* | 6/2021 | BeSerra | G06F 13/4282 |
| 11,258,719 B1* | 2/2022 | Sommers | H04L 43/04 |
| 2012/0063316 A1 | 3/2012 | Ghanwani et al. | |
| 2015/0281099 A1* | 10/2015 | Banavalikar | H04L 12/4641 370/230 |
| 2016/0036774 A1 | 2/2016 | Chong et al. | |
| 2016/0188527 A1* | 6/2016 | Cherian | H04L 41/12 709/212 |
| 2016/0212214 A1 | 7/2016 | Rahman et al. | |
| 2017/0171075 A1* | 6/2017 | Sajeepa | H04L 45/745 |
| 2019/0116126 A1 | 4/2019 | Shen et al. | |
| 2019/0207868 A1 | 7/2019 | Chang et al. | |
| 2019/0303345 A1 | 10/2019 | Zhu et al. | |
| 2019/0354406 A1* | 11/2019 | Ganguli | G06F 9/45558 |
| 2019/0394067 A1 | 12/2019 | Yu | |
| 2020/0021532 A1 | 1/2020 | Borikar et al. | |
| 2020/0151137 A1 | 5/2020 | Izenberg et al. | |
| 2020/0192695 A1 | 6/2020 | Vincent et al. | |
| 2020/0280518 A1 | 9/2020 | Lee et al. | |
| 2020/0382329 A1* | 12/2020 | Yuan | H04L 45/74 |
| 2021/0368029 A1* | 11/2021 | Zhang | H04L 47/196 |
| 2022/0058146 A1* | 2/2022 | Balakrishnan | G06F 3/067 |
| 2022/0060417 A1* | 2/2022 | Kfir | H04L 45/66 |
| 2022/0092021 A1 | 3/2022 | Cherian et al. | |
| 2022/0171663 A1* | 6/2022 | Hiregoudar | G06F 9/5077 |

OTHER PUBLICATIONS

Oracle Introduces Exadata Cloud Service X8M, Oracle, Available Online at https://www.oracle.com/news/announcement/oracle-introduces-exadata-cloud-service-x8m-101520.html, Accessed from Internet on: Feb. 2, 2021, 5 pages.
RDMA Over Converged Ethernet (RoCE) Design Guide, Hewlett Packard Enterprise, 2017, 22 pages.
Supplement to InfiniBandTM Architecture Specification, Annex A17: RoCEv2, vol. 1 Release 1.2.1, Sep. 2, 2014, 23 pages.
Guo et al., RDMA over Commodity Ethernet at Scale, SIGCOMM '16: Proceedings of the 2016 ACM SIGCOMM Conference, Aug. 22-26, 2016, 14 pages.
Harkins, RDMA over Converged Ethernet, Mellanox Technologies, May 2017, 24 pages.
Parish, Introducing Exadata X8M: In-Memory Performance with All the Benefits of shared storage for both OLTP and Analytics, Available Online at https://blogs.oracle.com/exadata/exadata-x8m, Sep. 17, 2019, 10 pages.
Zhu et al., Congestion Control for Large-Scale RDMA Deployments, ACM SIGCOMM Computer Communication Review, Aug. 17-21, 2015, pp. 523-536.
International Application No. PCT/US2021/027069, "Invitation to Pay Additional Fees and, Where Applicable, Protest Fee", dated Sep. 23, 2021, 5 pages.
International Application No. PCT/US2021/025459, International Search Report and Written Opinion, dated Jul. 30, 2021, 11 pages.
U.S. Appl. No. 17/165,877, Non-Final Office Action dated Aug. 4, 2022, 16 pages.
U.S. Appl. No. 17/165,877, "Final Office Action", dated May 25, 2023, 18 pages.
U.S. Appl. No. 17/165,877, "Non-Final Office Action", dated Sep. 19, 2023, 19 pages.

* cited by examiner

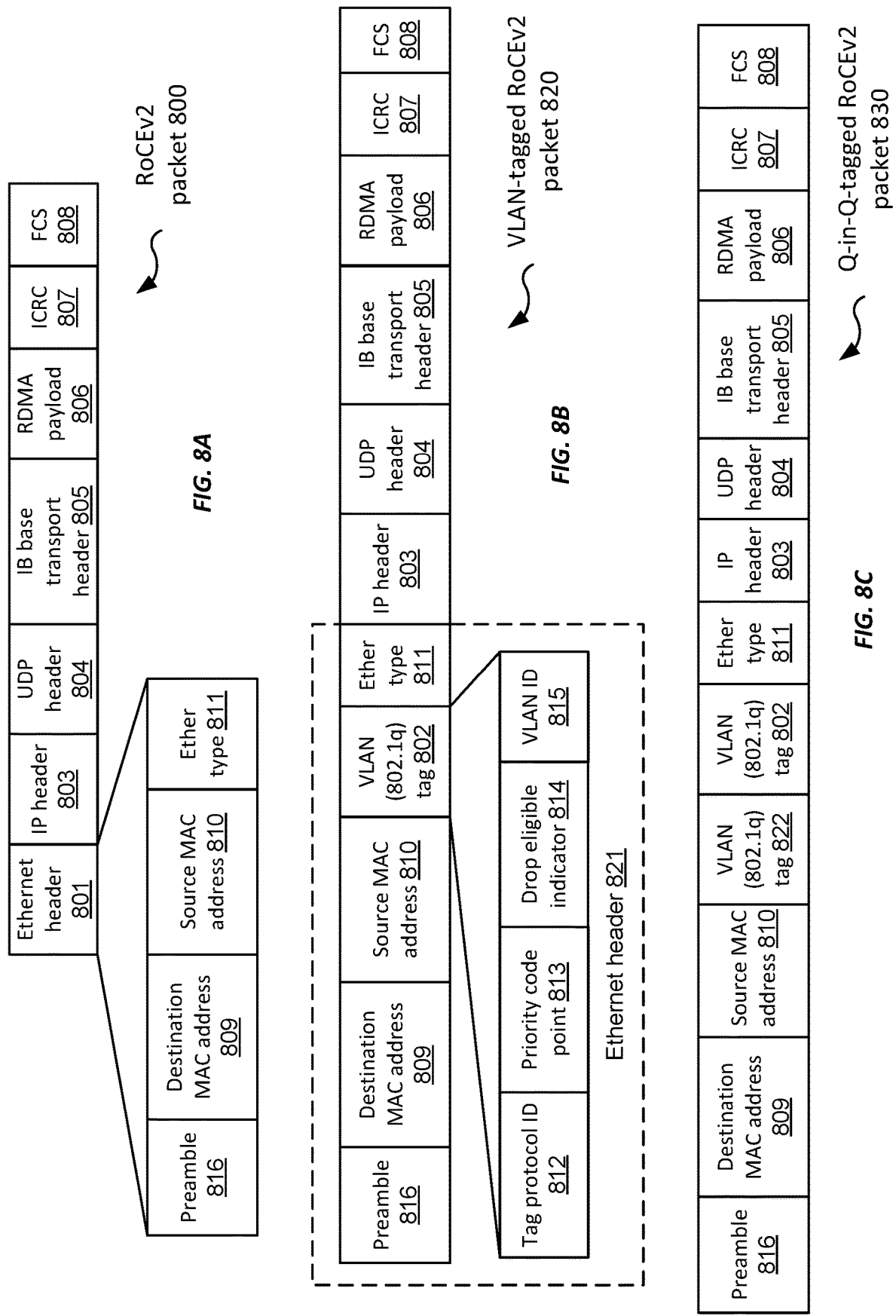

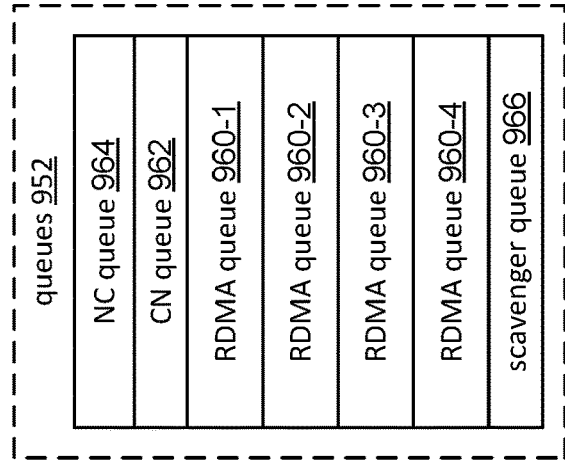
FIG. 9C
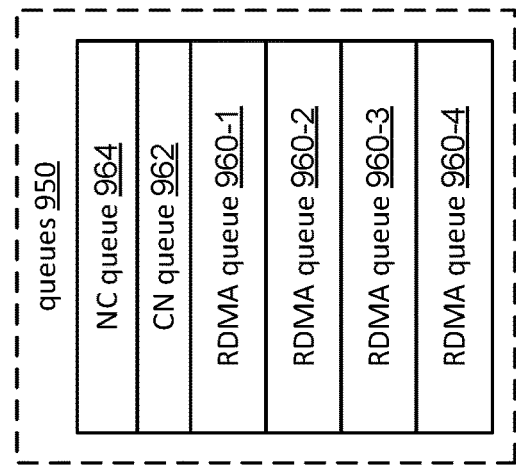
FIG. 9B
FIG. 9A

CLASS-BASED QUEUEING FOR SCALABLE MULTI-TENANT RDMA TRAFFIC

CROSS-REFERENCE TO RELATED APPLICATIONS

This non-provisional application claims priority to U.S. Provisional Application No. 63/132,417, filed on Dec. 30, 2020, entitled "CLOUD SCALE MULTI-TENANCY FOR RDMA OVER CONVERGED ETHERNET (RoCE)," which is incorporated by reference herein in its entirety for all purposes.

BACKGROUND

RDMA over Converged Ethernet (RoCE) is a network protocol that allows remote direct memory access (RDMA) over a lossless Ethernet network. RoCE enables this by encapsulating an InfiniBand (IB) transport packet over Ethernet. Typically, RoCE involves a Layer-2 network having dedicated RDMA queues and dedicated VLANs. Layer-2 networks, however, do not scale and are not very performant because they lack key properties and characteristics present in more scalable and performant Layer-3 networks. Existing public cloud implementations are thus unable to provide data transfers using the RoCE protocol.

BRIEF SUMMARY

The present disclosure relates generally to data networking. More particularly, techniques are described that enable Layer-2 traffic to be communicated over a Layer-3 network using Layer-3 protocols. In certain embodiments, the techniques describe herein enable Remote Direct Memory Access (RDMA) traffic (e.g., RDMA over Converged Ethernet (RoCE) traffic) to be communicated from a compute instance on a multi-tenant host machine (i.e., a host machine hosting compute instances belonging to different tenants or customers) to a compute instance on another multi-tenant host machine over a shared Layer-3 physical network or switch fabric using Layer-3 routing protocols. Such communication may optionally include other traffic (e.g., TCP and/or UDP traffic) as well. The customer or tenant experiences the communication as occurring over a dedicated Layer-2 network, while the communication actually occurs over a shared (i.e., shared between multiple customers or tenants) Layer-3 network using Layer-3 routing protocols. Various embodiments are described herein, including methods, systems, non-transitory computer-readable storage media storing programs, code, or instructions executable by one or more processors, and the like.

In certain embodiments, a method of data networking comprises, by a networking device, receiving a first RDMA packet having a first quality-of-service (QoS) data field; based on a value of the first QoS data field, queueing the first RDMA packet in a first queue of a plurality of queues; by the networking device, receiving a second RDMA packet having a second QoS data field; and based on a value of the second QoS data field, queueing the second RDMA packet in a second queue of the plurality of the queues, the second queue being different than the first queue. The method may further comprise retrieving the first RDMA packet from the first queue, and retrieving the second RDMA packet from the second queue, according to a first weighting among the plurality of queues. The first weighting may be a weighted-round-robin scheme. Additionally or alternatively, the plurality of queues may include a control queue, and the method may further comprise, by the networking device, retrieving a plurality of control packets from the control queue, wherein the retrieving the plurality of control packets has a strict priority over the retrieving the first RDMA packet and the retrieving the second RDMA packet. In such a case, the plurality of queues may include a plurality of RDMA queues that includes the first queue and the second queue, and the control queue may be configured to have a lower bandwidth than any of the plurality of RDMA queues. The plurality of control packets may include at least one of a network control protocol packet or a congestion notification packet.

In a method as described above, the first QoS data field may be a Differentiated Services Code Point (DSCP) data field of an Internet Protocol (IP) header of the first RDMA packet. Each of the first and second RDMA packets may be a RoCEv2 packet; alternatively, each of the first and second RDMA packets may be a Layer-3 encapsulated packet that is formatted in accordance with an overlay encapsulation protocol (e.g., one among VxLAN, NVGRE, GENEVE, STT, and MPLS), and the method may further comprise decapsulating the first RDMA packet to obtain a first decapsulated RDMA packet, and copying congestion indication information from at least one outer header of the first RDMA packet to the first decapsulated RDMA packet. Any of the methods described above may further comprise receiving a plurality of RDMA packets, each of the plurality of RDMA packets having a corresponding QoS data field; for each of the plurality of RDMA packets, queuing the RDMA packet in a queue of the plurality of queues, based on a value of the QoS data field of the RDMA packet; and retrieving the plurality of RDMA packets from the plurality of queues, wherein the plurality of RDMA packets includes a plurality of packet flows, and wherein the method further comprises routing the plurality of packet flows according to a per-flow equal-cost multipath scheme.

In yet other embodiments, techniques are described for class-based queuing of RDMA traffic (e.g., in a Layer-3 network), which may be used to maintain class-based separation across a network fabric at cloud scale so that RDMA traffic in a particular queue does not impact on RDMA traffic in other queues. According to certain embodiments, a system may be implemented to include a shared fabric for transport of RDMA traffic of different classes and from different tenants, wherein each device in a path across the shared fabric from one RDMA network interface controller (NIC) to another includes multiple queues dedicated to different classes of RDMA traffic.

According to certain embodiments, a method of queuing RDMA packets includes, by a networking device, receiving a plurality of RDMA packets. Each RDMA packet in the plurality of RDMA packets includes a quality-of-service (QoS) data field, and for each RDMA packet in the plurality of RDMA packets, the QoS data field has a QoS value that indicates a class of service for the RDMA packet and is among a plurality of QoS values. This method also includes, by the networking device, distributing the plurality of RDMA packets among a plurality of RDMA queues. The distributing is performed according to a first mapping of the plurality of QoS values to the plurality of RDMA queues. This method further includes, by the networking device, retrieving the plurality of RDMA packets from the plurality of RDMA queues according to a first weighting among the plurality of RDMA queues. The retrieved plurality of RDMA packets may include a plurality of packet flows, in which case the example may further include routing the plurality of packet flows of the retrieved plurality of RDMA packets according to a per-flow equal-cost multipath scheme. Each RDMA packet in the plurality of RDMA packets may be a RoCEv2 packet, or each RDMA packet in the plurality of RDMA packets may be a Layer-3 encapsulated packet that is formatted in accordance with an overlay encapsulation protocol (e.g., VxLAN, NVGRE, GENEVE, STT, or MPLS).

In a further example, the distributing includes, in response to determining that the QoS data field of a first RDMA packet in the plurality of RDMA packets has a first QoS value, storing the first RDMA packet to a first RDMA queue in the plurality of RDMA queues; and, in response to determining that the QoS data field of a second RDMA packet in the plurality of RDMA packets has a second QoS value, storing the second RDMA packet to a second RDMA queue in the plurality of RDMA queues, wherein the second QoS value is different than the first QoS value.

According to certain embodiments, a further method of queuing RDMA packets also includes, by the networking device, retrieving a plurality of control packets from a control queue, wherein the retrieving the plurality of control packets has a strict priority over the retrieving the plurality of RDMA packets. In this case, the control queue may be configured to have a lower bandwidth than any of the plurality of RDMA queues. Alternatively or additionally, the plurality of control packets may include at least one network control protocol packet (e.g., BGP packet) and/or at least one congestion notification packet (CNP packet).

According to certain embodiments, a networking device (e.g., a leaf switch or a spine switch) may be configured to include a plurality of RDMA queues, and processing circuitry coupled to the plurality of RDMA queues and configured to receive a plurality of RDMA packets, wherein each RDMA packet in the plurality of RDMA packets includes a quality-of-service (QoS) data field; distribute the plurality of RDMA packets among the plurality of RDMA queues according to a first mapping of a plurality of QoS values to the plurality of RDMA queues; and retrieve the plurality of RDMA packets from the plurality of RDMA queues according to a first weighting among the plurality of RDMA queues. For each RDMA packet in the plurality of RDMA packets, the QoS data field has a value that indicates a class of service for the RDMA packet and is among the plurality of QoS values.

In yet other embodiments, techniques are described for class-based marking of encapsulated Remote Direct Memory Access (RDMA) traffic, which may be used to maintain consistent class-based separation across a network fabric at cloud scale (e.g., during Layer 3 transport) so that RDMA traffic in a particular queue does not impact on RDMA traffic in other queues. According to certain embodiments, a system may be implemented to include a shared fabric for transport of RDMA traffic of different classes and from different tenants, wherein each device in a path across the shared fabric from one RDMA network interface controller (NIC) to another includes multiple queues dedicated to different classes of RDMA traffic. Various inventive embodiments are described herein, including methods, systems, non-transitory computer-readable storage media storing programs, code, instructions executable by one or more processors, and the like.

According to certain embodiments, a method of data networking includes, by a networking device, receiving a plurality of RDMA packets. Each RDMA packet in the plurality of RDMA packets includes a quality-of-service (QoS) data field that has a QoS value that indicates a class of service for the RDMA packet. The plurality of RDMA packets includes RDMA packets for which the QoS data field has a first QoS value, and RDMA packets for which the QoS data field has a second QoS value that is different from the first QoS value. The method also includes, for each of the plurality of RDMA packets, encapsulating the RDMA packet to produce a corresponding one of a plurality of Layer-3 encapsulated packets, the corresponding Layer-3 encapsulated packet having at least one outer header. For each of the plurality of RDMA packets, the encapsulating of the RDMA packet includes addition of at least one outer header of the corresponding Layer-3 encapsulated packet to the RDMA packet. For each of the plurality of Layer-3 encapsulated packets, a QoS data field of the at least one outer header of the Layer-3 encapsulated packet takes a QoS value that is based on the QoS value of the QoS data field of the corresponding RDMA packet. For each Layer-3 encapsulated packet in the plurality of-Layer-3 encapsulated packets, the at least one outer header may include a virtual network identification field that is based on a VLAN ID of the corresponding RDMA packet. In such case, the plurality of RDMA packets may include RDMA packets that each have a first VLAN ID (with some packets possibly having a different QoS value than others), and RDMA packets that each have a second VLAN ID that is different from the first VLAN ID. Alternatively or additionally, at least one Layer-3 encapsulated packet in the plurality of Layer-3 encapsulated packets may include a first VLAN tag and a second VLAN tag that is different than the first VLAN tag.

For each of the plurality of Layer-3 encapsulated packets, the at least one outer header of the encapsulated packet may include a User Datagram Protocol (UDP) header having a destination port number of 4791 (e.g., RoCEv2 reserved UDP port). Alternatively or additionally, the at least one outer header of the Layer-3 encapsulated packet may include an Internet Protocol (IP) header having a destination IP address that is associated with a destination Media Access Control (MAC) address of the corresponding RDMA packet.

For each RDMA packet in the plurality of RDMA packets, the QoS data field of the RDMA packet may be a DSCP data field of an IP header of the RDMA packet. In this case, for each of the plurality of Layer-3 encapsulated packets, the QoS value in the QoS data field of the at least one outer header of the Layer-3 encapsulated packet may be equal to the QoS value in the QoS data field of the corresponding RDMA packet. Alternatively, for each RDMA packet in the plurality of RDMA packets, the QoS data field of the RDMA packet may be an IEEE 802.1p data field of a VLAN tag. In this case, the encapsulating the RDMA packet may include obtaining, from the QoS value of the QoS data field of the RDMA packet and a mapping of QoS values, a QoS value for the QoS data field of the at least one outer header of the corresponding Layer-3 encapsulated packet, and storing the obtained QoS value to the QoS data field of the at least one outer header of the Layer-3 encapsulated packet.

According to certain embodiments, a further method of data networking also includes, for each of at least one Layer-3 encapsulated packet in the plurality of Layer-3 encapsulated packets, copying congestion indication information from the corresponding RDMA packet to the at least one outer header of the Layer-3 encapsulated packet. Alternatively or additionally, the method of data networking may further include decapsulating each of a second plurality of Layer-3 encapsulated packets to obtain a corresponding one of a plurality of decapsulated RDMA packets. For at least one of the plurality of decapsulated RDMA packets, the decapsulating may include copying congestion indication information from the at least one outer header of the corresponding Layer-3 encapsulated packet to the decapsulated RDMA packet.

According to certain embodiments, a non-transitory computer-readable memory may store a plurality of instructions executable by one or more processors, the plurality of instructions comprising instructions that when executed by the one or more processors cause the one or more processors to perform any one of the above methods.

According to certain embodiments, a system may include one or more processors, as well as a memory coupled to the one or more processors. The memory may store a plurality of instructions executable by the one or more processors, the plurality of instructions comprising instructions that when executed by the one or more processors cause the one or more processors to perform any one of the above methods.

The foregoing, together with other features and embodiments will become more apparent upon referring to the following specification, claims, and accompanying drawings.

BRIEF DESCRIPTION OF THE DRAWINGS

FIG. 8A shows an RDMA packet format according to version 2 of the RDMA over Converged Ethernet (RoCEv2) protocol.

FIG. 8B shows a format of a VLAN-tagged RoCEv2 packet according to certain embodiments.

FIG. 8C shows a format of a Q-in-Q-tagged RoCEv2 packet according to certain embodiments.

FIG. 9A shows a format of an Internet Protocol (IP) header.

FIGS. 9B and 9C show implementations of a plurality of queues according to certain embodiments.

DETAILED DESCRIPTION

Figure 1:
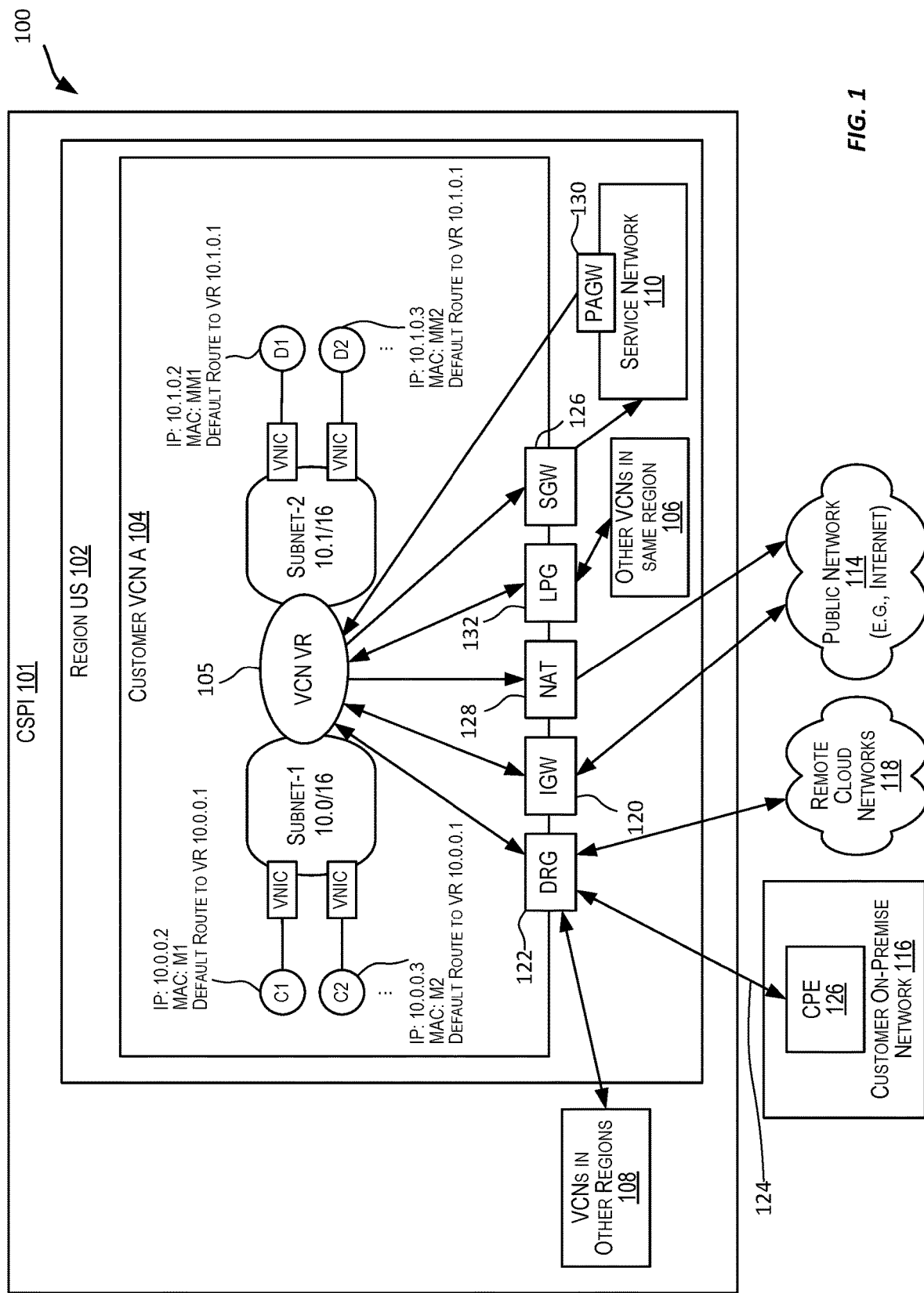
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to networking, and more particularly to techniques that enable Layer-2 traffic to be communicated over a Layer-3 network using Layer-3 protocols. In certain embodiments, the techniques describe herein enable RDMA over Converged Ethernet (RoCE) traffic to be communicated from a compute instance on a multi-tenant host machine (i.e., a host machine hosting compute instances belonging to different tenants or customers) to a compute instance on another multi-tenant host machine over a shared Layer-3 physical network or switch fabric using Layer-3 routing protocols. The customer or tenant experiences the communication as occurring over a dedicated Layer-2 network, while the communication actually occurs over a shared (i.e., shared between multiple customers or tenants) Layer-3 network using Layer-3 routing protocols.

Techniques are also disclosed that enable VLAN identifying information (e.g., a VLAN ID), which may identify a tenant, to be specified in a Layer-2 header of a RoCE packet (e.g., the VLAN ID is included in the 802.1Q tag that is added to the RoCE packet) and also for the VLAN identifying information to be mapped to information that is included in a Layer-3 overlay encapsulation protocol wrapper that is added to the 802.1Q tagged RoCE Layer-2 packet as the packet travels through the switch fabric. Mapping the VLAN identifying information (or tenancy information) to a field of the Layer-3 encapsulating wrapper makes the distinction among traffic from different tenants visible to the networking devices in the Layer-3 switch fabric. The networking devices may use this information to segregate the traffic belonging to different customers or tenants.

Techniques are disclosed that enable QoS information associated with a Layer-2 RDMA packet (e.g., a RoCE packet) to be preserved end-to-end from the source host machine from which data is being transferred, all the way through the switch fabric, and to the destination host machine where the data is to be transferred. The QoS information encoded in a Layer-2 RoCE packet is made visible to the networking devices in the switch fabric by encoding that information into the Layer-3 overlay encapsulation protocol wrapper that is added to the 802.1Q tagged RoCE packet by the initial switch handling traffic sent by a host (e.g., the ingress Top-of-Rack (TOR) switch) when the packet enters the switch fabric. Mapping (e.g., copying) the QoS information into the encapsulating wrapper enables the networking devices in the switch fabric to route RoCE traffic through the switch fabric using Layer-3 routing protocols and according to the QoS information associated with each packet.

Techniques are also disclosed that enable any of the networking devices in the switch fabric to signal congestion on a per-packet basis. This congestion information is preserved in a packet as the packet travels through the switch fabric from the TOR switch connected to the source host machine ("the ingress TOR switch") to the TOR switch connected to the destination host machine ("the egress TOR switch"). At the TOR switch connected to the destination host machine, the congestion information from the Layer-3 encapsulating wrapper is translated (e.g., copied) to the RoCE packet header (e.g., to the ECN bits in the IP header of the RoCE packet) and is thus preserved and made available to the destination host machine. The destination host machine can then respond to the congestion information by sending congestion notification packets (e.g., to indicate the congestion to the source host machine so that it can, for example, decrease its transmission rate accordingly).

In a typical computing environment, when data is being exchanged between two computers, the data being transferred is copied multiple times by the network protocol stack software that is executed by the computers. This is referred to as the multi-copy problem. Additionally, the OS kernel and the CPUs of the computers are involved in these communications since the network stack (e.g., the TCP stack) is inherent to the kernel. This introduces significant latency in the data transfer, latency that some applications cannot tolerate.

Remote direct memory access (RDMA) is a direct memory access mechanism that enables movement of data between application memories of computers or servers without involving the CPUs (CPU bypass) or the operating systems (OS kernel bypass) of the computers. This mechanism permits high-throughput, high data transfer rates, and low-latency networking. RDMA supports zero-copy networking by enabling the network adapter or network interface card (NIC) on a computer to transfer data from the wire directly to the application memory of the computer or to transfer data from the application memory of the computer directly to the wire, eliminating the need to copy data between the application memory and the data buffers in the operating system of the computer. Such transfers require little to no work to be done by CPUs or caches and avoid context switches of the computer, and the transfers may continue in parallel with other system operations. RDMA is very useful for high-performance computing (HPC) and for applications that require low latency.

RDMA over Converged Ethernet (RoCE) is a network protocol that allows remote direct memory access (RDMA) over a lossless Ethernet network. RoCE enables this by encapsulating an InfiniBand (IB) transport packet over Ethernet. Typically, RoCE involves dedicated RDMA queues and dedicated VLANs, and the use of a Layer-2 network. Layer-2 networks, however, do not scale and are not very performant because they lack key properties and characteristics present in more scalable and performant Layer-3 networks. For example, Layer-2 networks: do not support multiple paths between a data producer (e.g., source) and a data consumer (e.g., destination) in the network fabric; have issues with Layer-2 loops; have issues with flooding of Layer-2 frames; lack support for a hierarchy in the address scheme (e.g., Layer-2 has no notion of CIDRs, prefixes, and subnets); have issues with high volume broadcast traffic; lack control protocols (e.g., Layer-2 lacks protocols analogous to BGP, RIP, or IS-IS) that allow for advertisement of network connectivity; lack trouble shooting protocols and tools (e.g., Layer-2 lacks tools such as ICMP or Traceroute); and the like.

There are currently two versions of the RoCE protocol-RoCEv1 and RoCEv2. RoCEv2, also called "routable RoCE", is defined in the document "InfiniBand™ Architecture Specification Release 1.2.1 Annex A17: RoCEv2" (InfiniBand Trade Association, Beaverton, OR, 2 Sep. 2014). RoCEv2 uses User Datagram Protocol (UDP) as the transport protocol. Unfortunately, UDP lacks the sophisticated congestion control and congestion control mechanisms that TCP provides. As a result, RoCEv2 suffers from issues such as the following: network livelock (e.g., processes are changing state, and frames move, but frames do not advance); network deadlock (e.g., processes remain in waiting state due to cyclic resource dependency); head-of-line (HOL) blocking (e.g., a failure to forward the packet at the head of a queue holds up packets behind it); victim flows (e.g., a flow between non-congested nodes via a congested switch); unfairness (e.g., high-bandwidth flows increase latency for other flows); and adverse effects on lossy traffic (such as TCP) due to buffer consumption by lossless traffic (such as RDMA).

Successful RoCEv2 implementation also typically requires network paths and VLANs that are dedicated to RDMA traffic. Furthermore, RoCEv2 as a protocol relies on Layer-2 Priority Flow Control (PFC), Explicit Congestion Notification (ECN), or a combination of PFC and ECN to achieve some semblance of congestion management, but these schemes are often insufficient in practice. PFC supports up to eight independent classes of traffic and allows a receiver to request a transmitter to pause flow of a specified class of traffic by sending a PAUSE frame to the transmitter. Unfortunately, PFC is prone to PAUSE frame storms (e.g., an excessive amount of PAUSE frames affects all traffic of the specified class along the entire path to the traffic source) which can lead to a complete deadlock of the network. Furthermore, PFC PAUSE frames do not allow multi-tenant operation, since PAUSE frames cause the transmitter to pause transmission of all traffic of the specified class—and while PFC provides for a maximum of eight traffic classes, the number of tenants may be many times greater than eight.

Embodiments disclosed herein include systems, methods, and apparatus for implementing multi-tenancy RDMA over Converged Ethernet (RoCE) at the scale of a Public Cloud. For example, the environment may scale to extremely large sized networks spanning hundreds, thousands, or more hosts. Such embodiments disclosed herein include techniques for supporting multi-tenant RoCE traffic in a Public Cloud while avoiding head-of-line blocking and while maintaining high performance, low latency, and lossless operation for RDMA applications. At the same time, the disclosed techniques may also be implemented to support the regular non-RDMA applications that use TCP/IP or UDP as their transport protocol. These techniques may be applied to RoCE-capable Ethernet network interfaces at all the standard speeds including, for example, 25 G, 40 G, 100 G, 400 G and 800 G.

Techniques for scaling RoCE in the cloud as disclosed herein may include one or more of the following aspects: providing each customer with a VLAN or a set of VLANs for their traffic; allowing hosts to use 802.1q-in-802.1q to segregate traffic in-between customers and across different applications for a given customer (for example, packets may have two 802.1Q tags: a public VLAN tag and a private VLAN tag); mapping each VLAN to a VxLAN VNI on the ToR, and assigning each customer and each of their VLANs a unique VxLAN VNI; using a VxLAN overlay to carry customer's Layer-2 traffic on top of a Layer-3 network; using EVPN (Ethernet VPN) to carry MAC address information across the underlying Layer-3 network (the substrate).

Embodiments may be implemented as described herein to support multiple RDMA applications (e.g., cloud services, High Performance Computing (HPC), and/or database applications) each with multiple traffic classes. Such support may be provided by isolating their traffic using a concept of network QoS traffic class in which distinct traffic classes with mission-critical traffic are allocated a dedicated set of RDMA queues. This isolation using RDMA queues may ensure that a particular queue (e.g., congestion of the particular queue) does not impact another queue. Such techniques may be used to support multiple RDMA tenants (also known as "public cloud customers") such that the queue configurations in the Clos Fabric are transparent to the end customer host (the cloud customer). The network may be configured to map the DSCP markings received from the customer host to the correct settings for the network queues, thus decoupling the host QoS policy (configuration) from the fabric QoS policy (configuration). Customers may signal their performance expectations using DSCP traffic classes (also called DSCP codepoints) and/or 802.1p traffic classes. These DSCP and 802.1p classes are mapped to QoS queues in the Clos Network in a manner that provides a decoupling of host QoS configuration from the Clos fabric QoS configuration.

In order to convey the QoS queue information as well as ECN markings through the Clos fabric, it may be desired to ensure that the QoS queue information is carried across multiple network domains: for example, from a Layer-2 port to a host, from a Layer-3 port to another switch, or from a VxLAN virtual Layer-2 port to another VxLAN interface on another switch. Such cross-domain transport of QoS queue information may include carrying and executing QoS markings and ECN bit markings across these various network domains as described herein.

Example Virtual Networking Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VxLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of a physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 11, 12, 13, and 14 (see references 1116, 1216, 1316, and 1416) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 11, 12, 13, and 15, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 11, 12, 13, and 14 (for example, gateways referenced by reference numbers 1134, 1136, 1138, 1234, 1236, 1238, 1334, 1336, 1338, 1434, 1436, and 1438) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
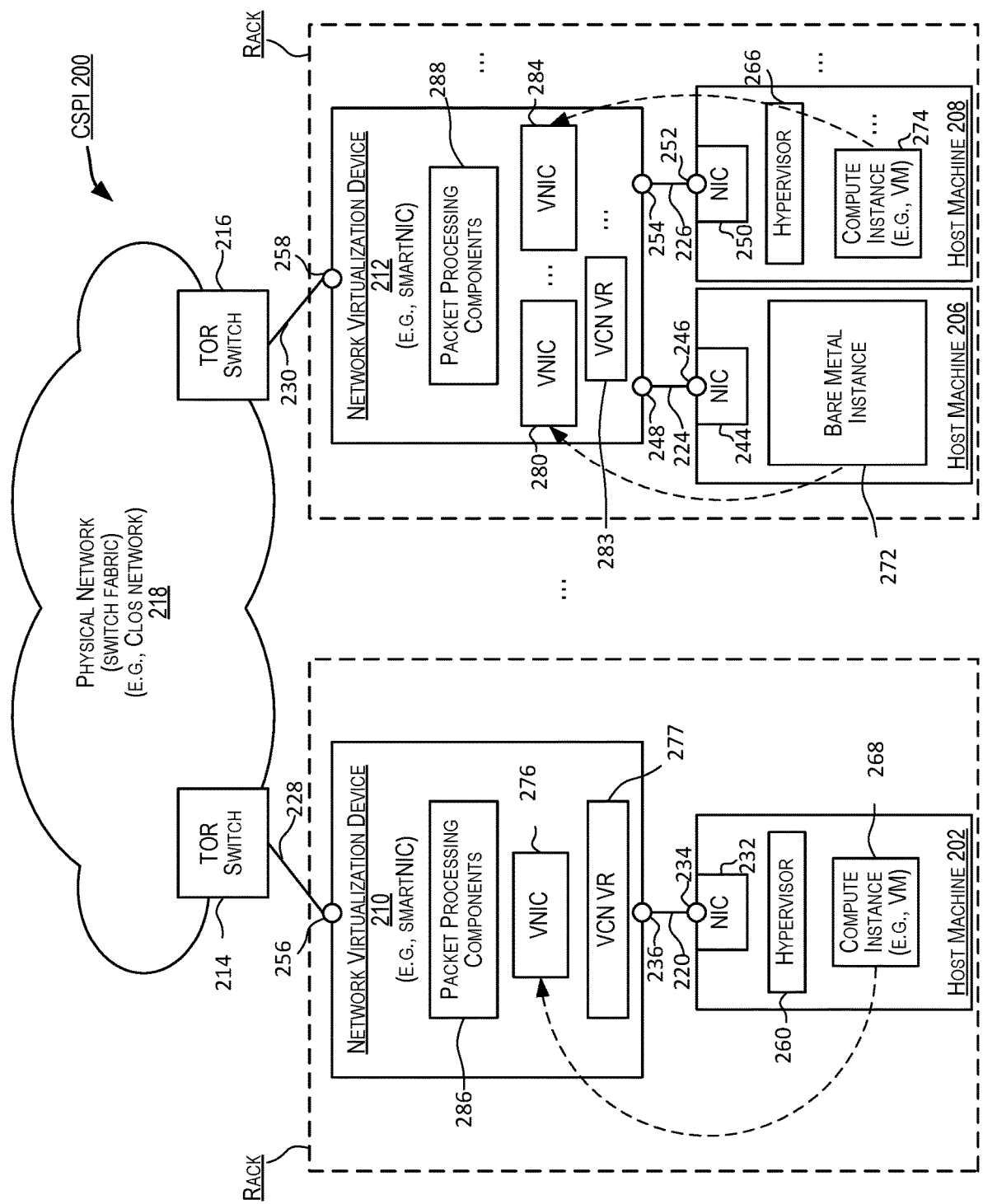
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
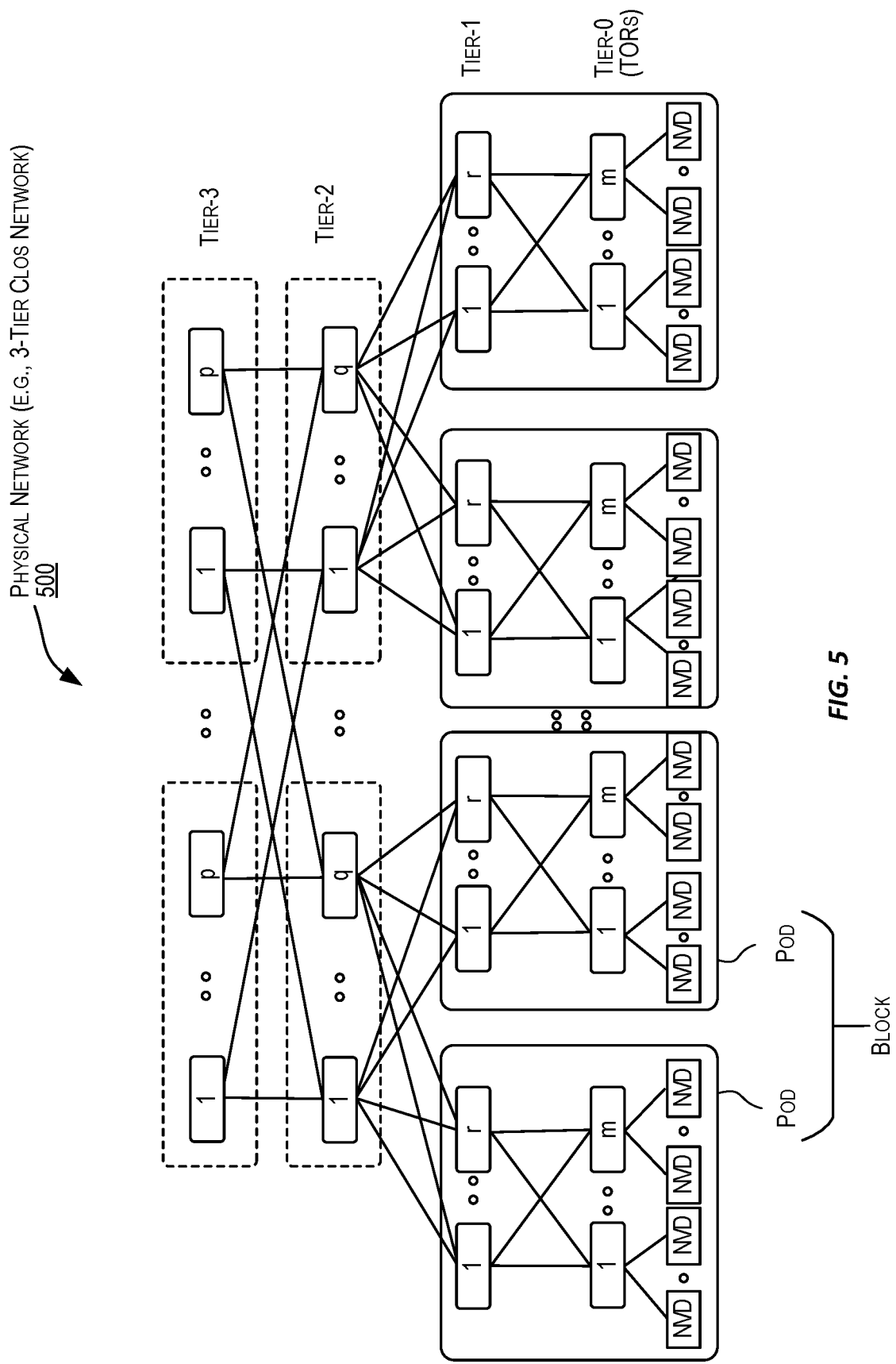
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
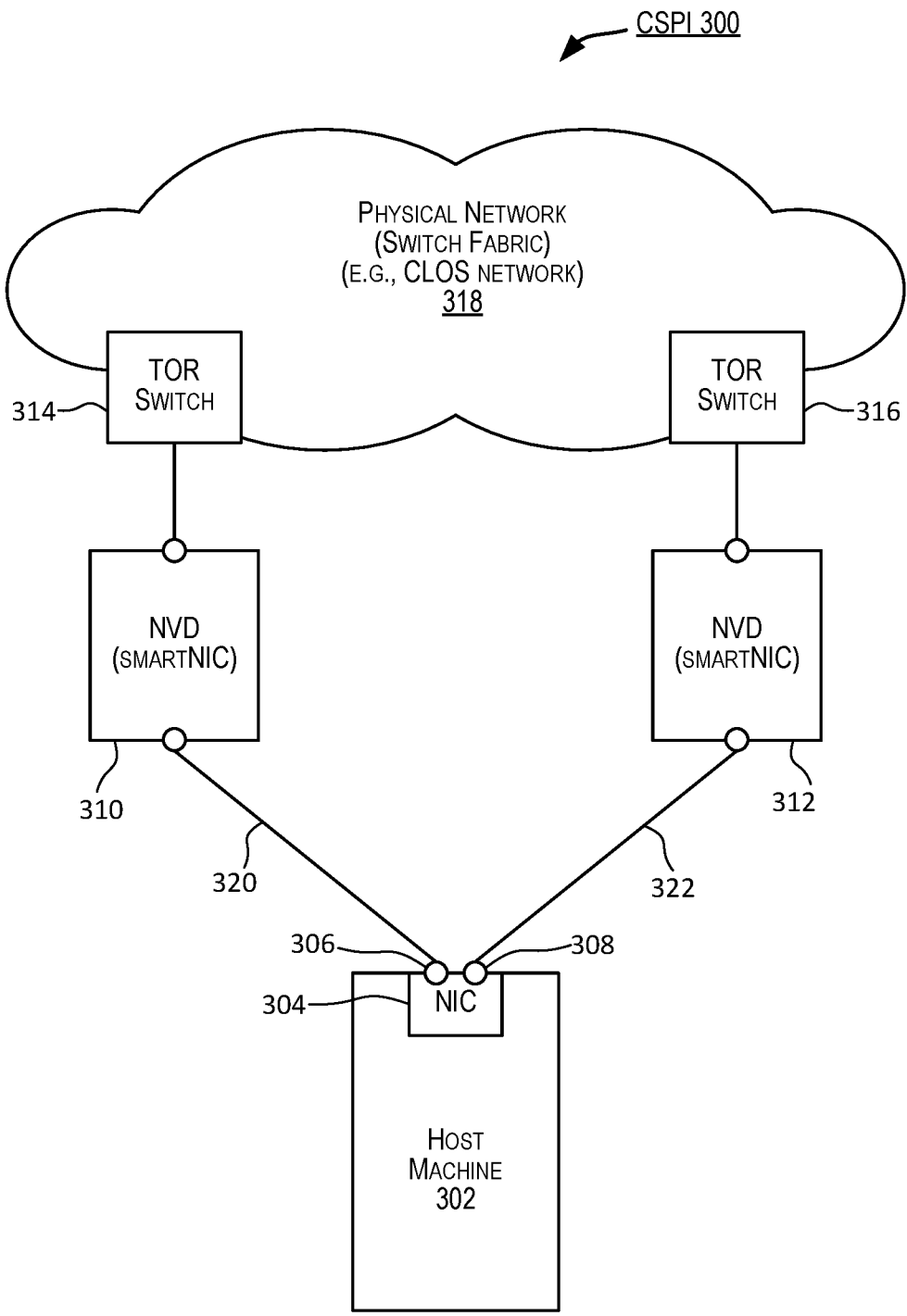
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 11, 12, 13, and 14 (see references 1116, 1216, 1316, and 1416) and described below. Examples of a VCN Data Plane are depicted in FIGS. 11, 12, 13, and 14 (see references 1118, 1218, 1318, and 1418) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
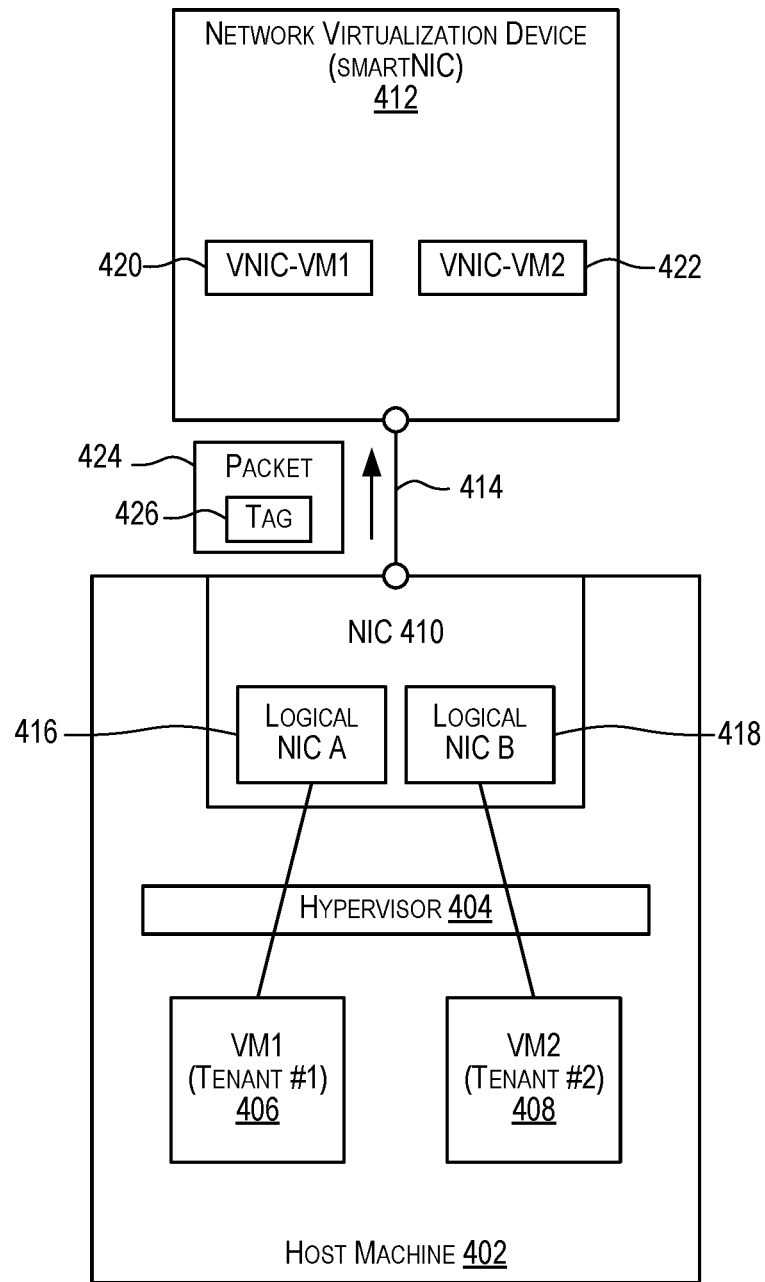
FIG. 4 depicts connectivity between a host machine and an NVD for providing I/O virtualization for supporting multi-tenancy according to certain embodiments.

FIG. 4 depicts connectivity between a host machine and an NVD for providing I/O virtualization for supporting multi-tenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "m" Tier-0 TOR switches are connected to a set of "r" Tier-1 switches (where the integers m and r may have the same value or different values) and together form a pod. Each Tier-0 switch in a pod is interconnected to all the Tier-1 switches in the pod, but there is no connectivity of switches between pods. In certain implementations, two pods are referred to as a block. Each block is served by or connected to a set of "q" Tier-2 switches (sometimes referred to as spine switches). There can be several blocks in the physical network topology. The Tier-2 switches are in turn connected to "p" Tier-3 switches (sometimes referred to as super-spine switches) (where the integers p and q may have the same value or different values). Communication of packets over physical network 500 is typically performed using one or more Layer-3 communication protocols. Typically, all the layers of the physical network, except for the TORs layer are redundant (e.g., p-ways, q-ways, or r-ways redundant) thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0 switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

RDMA/RoCE Techniques

Figure 6:
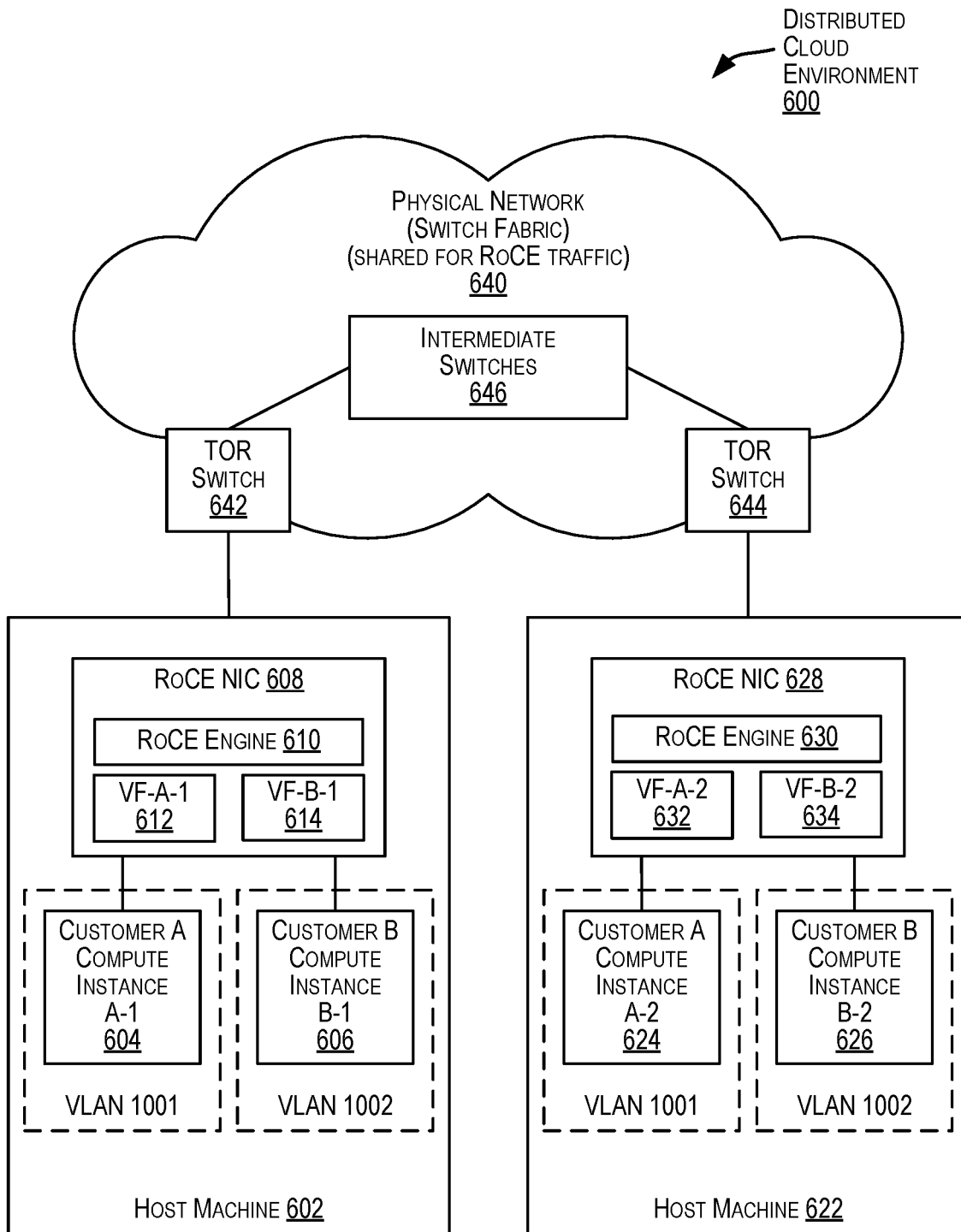
FIG. 6 shows an example of a distributed cloud environment for data networking according to certain embodiments.

FIG. 6 shows an example of a distributed multi-tenant cloud environment 600 that may be hosted by a cloud service provided infrastructure (CSPI). As shown in FIG. 6, multiple host machines (e.g., 602 and 622) are communicatively coupled via a physical network or switch fabric 640 comprising multiple switches or, more broadly, networking devices. In certain implementations, switch fabric 640 may be an n-tiered Clos network as depicted in FIG. 5 and described above, and the design may be optimized for performance with the Clos fabric and placement of the physical switches 642, 644, and 646. The value of "n" may be one, two, three, etc., depending upon the implementation. It is noted, however, that each additional tier would be expected to increase the latency of packet transfers across the fabric, which may be undesirable for certain applications. The top-of-the-rack (TOR) switches 642 and 644 represent the leaf or tier-0 devices in the switch fabric 640. Depending upon the value of "n", the switch fabric 640 may include one or more spine switches, super spine switches, and the like. In FIG. 6, the switches between TOR switch 642 and TOR switch 644 (e.g., the tier-1, tier-2, and tier-3 switches in FIG. 5) are represented by intermediate switches 646. Intermediate switches 646 may include one or more switches or networking devices in general. The switch fabric 640 may also be implemented to include switch substrate IP addresses (e.g., for management purposes) that are not reachable by the customer compute instances. It may be desired to implement Spanning Tree Protocol (STP) on the TOR switches of switch fabric 640 (e.g., to avoid loops, which may occur, for example, due to bugs). In some configurations, each TOR switch on switch fabric 640 is dedicated per-services (e.g., Database Cloud Service, HPC Cloud Service, GPU Cloud Service, etc.), and traffic of different services is mixed only at a higher tier (e.g. at intermediate switches 646).

Host machines 602 and 622 may host compute instances of multiple customers or tenants and may thus be referred to as multi-tenant host machines. For example, as depicted in FIG. 6, host machine 602 hosts a compute instance A-1 604 for customer A and a compute instance B-1 for customer B. Host machine 604 hosts a compute instance A-2 624 for customer A and a compute instance B-2 626 for customer B. In certain embodiments, compute instances 604, 606, 624, and 626 are virtual machines. In this manner, virtual machines belonging to different customers may be hosted on the same host machine. Each of these compute instances, however, experiences that it owns the entire host machine. In certain embodiments, the compute instances for a customer may also include bare metal hosts. The teachings of the present disclosure are applicable to compute instances in the form of virtual machines or bare metal hosts. For ease of explanation, the example of FIG. 1 shows only two multi-tenant host machines 602 and 622, but this is not intended to be limiting; the principles hereby disclosed are not limited to any particular number of multi-tenant hosts, and particular examples that include a greater number of multi-tenant hosts and/or that also include one or more compute instances that are bare metal hosts (e.g., single-tenant hosts) can also be implemented.

In a multi-tenant environment, as shown in FIG. 6, it is desirable that traffic originating from and directed to the compute instances for different customers be properly segregated from each other. In certain embodiments, this traffic segregation is done by configuring separate network domains for separate customers. For example, the compute instances of customer A may be assigned to a particular network domain, which is separate and different from the network domain to which compute instances of customer B are assigned. In certain implementations, these network domains may be configured in the form of virtual LANs (VLANs), where each VLAN is identified by a unique VLAN identifier. For example, in FIG. 6, the compute instances A-1 604 and A-2 624 of customer A are assigned to VLAN 1001, where "1001" represents the unique VLAN identifier. Compute instances B-1 606 and B-2 626 of customer B are assigned to VLAN 1002, where "1002" represents the unique VLAN identifier. For ease of explanation, the example of FIG. 1 shows only two members of each VLAN 1001 and 1002, but this is not intended to be limiting; the principles hereby disclosed are not limited to any particular number of VLAN members. Additionally, there can be multiple VLANs, not just two as depicted in FIG. 6. The IEEE 802.1Q standard supports identification of up to 4096 different VLANs, for example.

In certain implementations, compute instances belonging to the same customer may have different quality-of-service expectations. For example, a customer may have compute instances belonging to two or more different services (or applications or departments), such as a first set of one or more compute instances corresponding to a Service A (e.g., a simulation service) and a second set of compute instances corresponding to a Service B (e.g., a backup service), where the two services have very different quality-of-service expectations (e.g., in terms of latency, packet loss, bandwidth requirement, etc.). For example, Service A may be more sensitive to latency than Service B, and as a result, the customer may desire that traffic related to Service A be given a different traffic class (e.g., a higher priority) than traffic related to Service B. In such a situation, different compute instances belonging to the same customer can have different quality-of-service requirements.

Compute instances on the same VLAN or on peer VLANs (e.g., VLANs on different Layer-2 domains that belong to the same tenant but may have different VLAN IDs) may desire to communicate with each other. In certain implementations, the compute instances on a VLAN (or on peer VLANs) may be able to exchange data using RDMA and RoCE protocols. In such implementations, the host machines hosting the compute instances are equipped with special hardware and software that enables the RDMA and RoCE based communications. For example, as depicted in FIG. 6, host machines 602 and 622 include RDMA network interface cards (NICs) (e.g., RoCE NICs) 608 and 628, respectively, that enable a compute instance hosted by host machine 602 to exchange data with a compute instance hosted by host machine 622 and on the same VLAN (or on a peer VLAN) using RDMA and RoCE protocols. A RoCE NIC may be implemented, for example, as a hardware assembly (e.g., an interface card) installed within a host machine (e.g., RoCE NIC 608 installed in multi-tenant host machine 602 and RoCE NIC 628 installed in host machine 622). Compute instances A-1 604 and A-2 624 belonging to the same VLAN 1001 may exchange data using RDMA and RoCE protocols using RoCE NICs 608 and 628 in host machines 602 and 622, respectively. In certain implementations, the RoCE NICs are separate from the NICs depicted in FIGS. 2 and 3 and described above. In other implementations, the NICs depicted in FIGS. 2 and 3 may be configured to also operate as RoCE NICs.

As shown in the example depicted in FIG. 6, a RoCE NIC includes a RoCE engine and implements virtual functions (e.g., SR-IOV functions), where each of the virtual functions may be configured for a different corresponding one of the virtual machines supported by the host machine. In this example, the RoCE NIC is implemented to support multi-tenancy through a technology called SR-IOV (Single-Root Input/Output Virtualization), which allows a physical device to appear on the Peripheral Component Interconnect Express (PCI Express or PCIe) bus as multiple different virtual instances (also called "virtual functions" or VFs), each VF being assigned to a respective VM and having resources that are separate from those of the other VFs. For example, in FIG. 6, RoCE NIC 608 on host machine 602 includes a RoCE engine 610, a virtual function VF-A-1 612 for virtual machine compute instance A-1 604, and a virtual function VF-B-1 614 for virtual machine compute instance B-1 606. RoCE NIC 628 on host machine 622 includes a RoCE engine 630, a virtual function VF-A-2 632 for virtual machine compute instance A-2 624, and a virtual function VF-B-2 634 for virtual machine compute instance B-2 626. For ease of explanation the example in FIG. 6 shows only two virtual functions per host machine, but this is not intended to be limiting in any way; the principles described herein are not limited to any particular number of virtual functions. In one example, SR-IOV may support up to sixteen VFs for one physical NIC port, and a host machine may also have multiple RDMA NICs (e.g. multiple RoCE NICs).

In certain embodiments, a virtual function for a RoCE NIC is programmed by a hypervisor on the host machine for a particular virtual machine compute instance and is configured to enforce that packets from the virtual machine which are to be communicated over a network, such as switch fabric 640, are tagged with a VLAN tag (e.g., a 802.1Q VLAN tag) corresponding to the VLAN to which that virtual machine belongs. For the example depicted in FIG. 6, virtual function VF-A-1 612 may be configured to add a VLAN tag that indicates VLAN 1001 (e.g., a VLAN tag having a VLAN ID with the value 1001) to packets carrying data from virtual machine compute instance A-1 604, and virtual function VF-B-1 614 may be configured to add a VLAN tag that indicates VLAN 1002 (e.g., a VLAN tag having a VLAN ID with the value 1002) to packets carrying data from virtual machine compute instance B-1 606. In a similar manner, virtual function VF-A-2 632 may be configured to add a VLAN tag that indicates VLAN 1001 (e.g., a VLAN tag having a VLAN ID with the value 1001) to packets carrying data from virtual machine compute instance A-2 624 and virtual function VF-B-2 634 may be configured to add a VLAN tag that indicates VLAN 1002 (e.g., a VLAN tag having a VLAN ID with the value 1002) to packets carrying data from virtual machine compute instance B-2 626. These VLAN tags may be used by the downstream network components to isolate or segregate traffic belonging to the different VLANs (e.g., in FIG. 6, traffic belonging to compute instances of customer A from traffic belonging to the compute instances of customer B).

In certain implementations, a virtual function assigned to a respective compute instance is configured (e.g., in cooperation with the RoCE engine on the RoCE NIC) to perform direct memory access (DMA) read operations from, and to perform DMA write operations to, a memory space of the corresponding compute instance for RDMA data transfers. In the example of FIG. 6, the virtual function VF-A-1 612 is configured to, in conjunction with RoCE engine 608, perform direct memory access read and write operations for compute instance A-1 604 as part of the RDMA processing. Virtual functions VF-B-1 614 is similarly configured to, in conjunction with RoCE engine 608, perform direct memory access read and write operations for compute instance B-1 606 as part of the RDMA processing.

A RoCE engine in a RoCE NIC is configured to facilitate the transmission of RDMA/RoCE traffic from a host machine and to facilitate the receipt of RDMA/RoCE traffic transmitted by another host machine. In certain embodiments, a RoCE engine receives instructions (e.g., metadata) identifying an address range in the application memory of a compute instance, where the address range represents a block of data that is to be transferred to the application memory of a target compute instance using RDMA and RoCE. For example, RoCE engine 610 may receive information identifying an RDMA channel that has been set up for the data transfer and an address range representing a block of data that is to be transferred using RDMA from an application memory of compute instance A-1 604 (i.e., from application memory for A-1 provided by host machine 602) to the application memory of compute instance A-2 624 on host machine 622 (i.e., to the application memory for A-2 provided by host machine 622). The RoCE engine is configured to access the data from the source compute instance's application memory, packetize the data (i.e., generate and assemble Layer-2 frames for the data) in an appropriate packet format that enables the communication of the data to the target or destination compute instance, and then communicate the packets to a TOR switch (e.g., a leaf switch in the switch fabric to be used for transferring the data to the destination compute instance). The RoCE engine is thus an offload engine, and the CPU or OS of the host machine does not have to be involved in the data transfer. Such offloading reduces the latency involved in the data transfer.

For example, the RoCE engine 610 may be configured to attach headers (e.g., UDP and IP headers) and VLAN tags (e.g., as enforced by the virtual functions 612 and 614) to data payloads to create VLAN-tagged RoCEv2 format packets, and to send the RoCEv2 packets over the wire (e.g., an Ethernet cable) to a leaf switch (e.g., TOR switch 642) of switch fabric 640. With respect to traffic that is incoming to the RoCE engine from the switch fabric, the RoCE engine 610 may be configured to receive RoCEv2 packets from TOR switch 642, to remove the UDP and IP headers, to strip off the VLAN tag, and to forward each resulting frame (e.g., as the IB payload which was sent by the source host) to the SR-IOV virtual function that maps to the VLAN ID on which the packet was received. The virtual function may be configured to store the data payload of the packet to the memory space of a destination compute instance on the corresponding VLAN.

The Layer-2 frames assembled by the RoCE NIC are then communicated to the RoCE NIC of the host machine hosting the destination or target compute instance via the multiple networking devices in the Layer-3 switch fabric using Layer-3 routing protocols. For example, if data is being transferred from compute instance A-1 604 in FIG. 6 to destination compute instance A-2 624 on host machine 622 using RDMA and RoCE, the path taken by packet having the data payload is as follows: Source compute instance A-1 604 on host machine 602→RoCE NIC 608 on host machine 602→TOR switch 642→one or more intermediate switches 646→TOR switch 644→RoCE NIC 628 on host machine 622→compute instance A-2 624 on host machine 622. As part of this communication, TOR switch 642, which represents the ingress edge device for switch fabric 640, is configured to convert the Layer-2 frames received from the RoCE NIC to Layer-3 packets by encapsulating the packets within a wrapper (e.g., comprising one or more headers) that corresponds to the Layer-3 tunneling protocol used for communicating the packets over switch fabric 640. Various different tunneling protocols may be used such as VxLAN, NVGRE, STT, GENEVE, MPLS, and others. The Layer-3 packets then travel from TOR switch 642 and via one or more intermediate switches 646 to a TOR switch 644, which represents the egress edge device for switch fabric 640. TOR switch 644 is configured to decapsulate the packets and convert them to Layer-2 frames, which are then communicated to RoCE NIC 628 on host machine 622 that hosts the destination or target compute instance A-2 624. The RoCE NIC 628 on host machine 622 then transfers the data to the destination compute instance A-2 624. The packets may be transferred to compute instance A-2 by writing the packet data to the application memory of compute instance A-2 624. Details related to the processing performed by the various network components to facilitate transfer of data using RDMA and RoCE from a multi-tenant host machine to another multi-tenant host machine are described below.

As another example, if compute instance B-1 606 wants to transfer data to compute instance B-2 626, the path taken by a packet is as follows: Source compute instance B-1 606 on host machine 602→RoCE NIC 608 on host machine 602→TOR switch 642→one or more intermediate switches 646→TOR switch 644→RoCE NIC 628 on host machine 622→compute instance B-2 626 on host machine 622. As can be seen, the switch fabric 640 is shared by the customers or tenants for communication of their Layer-2 RoCE traffic. The same switch fabric is used to communicate RoCE packets for different tenants. RoCE packets (and, optionally, non-RoCE normal IP traffic) from different tenants are flowing through the same common network fabric. Isolation of traffic in this common network fabric is done using the tags associated with the packets. Each customer (e.g., the compute instances of a customer on a VLAN or on peer VLANs) experiences that it has a dedicated Layer-2 network for transferring the RoCE traffic, while the traffic is actually carried over a shared Layer-3 cloud-based switch fabric network. The host machine generating the RoCE traffic according to the customer's application generates Layer-2 Ethernet frames (also called Layer-2 packets), not Layer-3 packets.

Figure 7A:
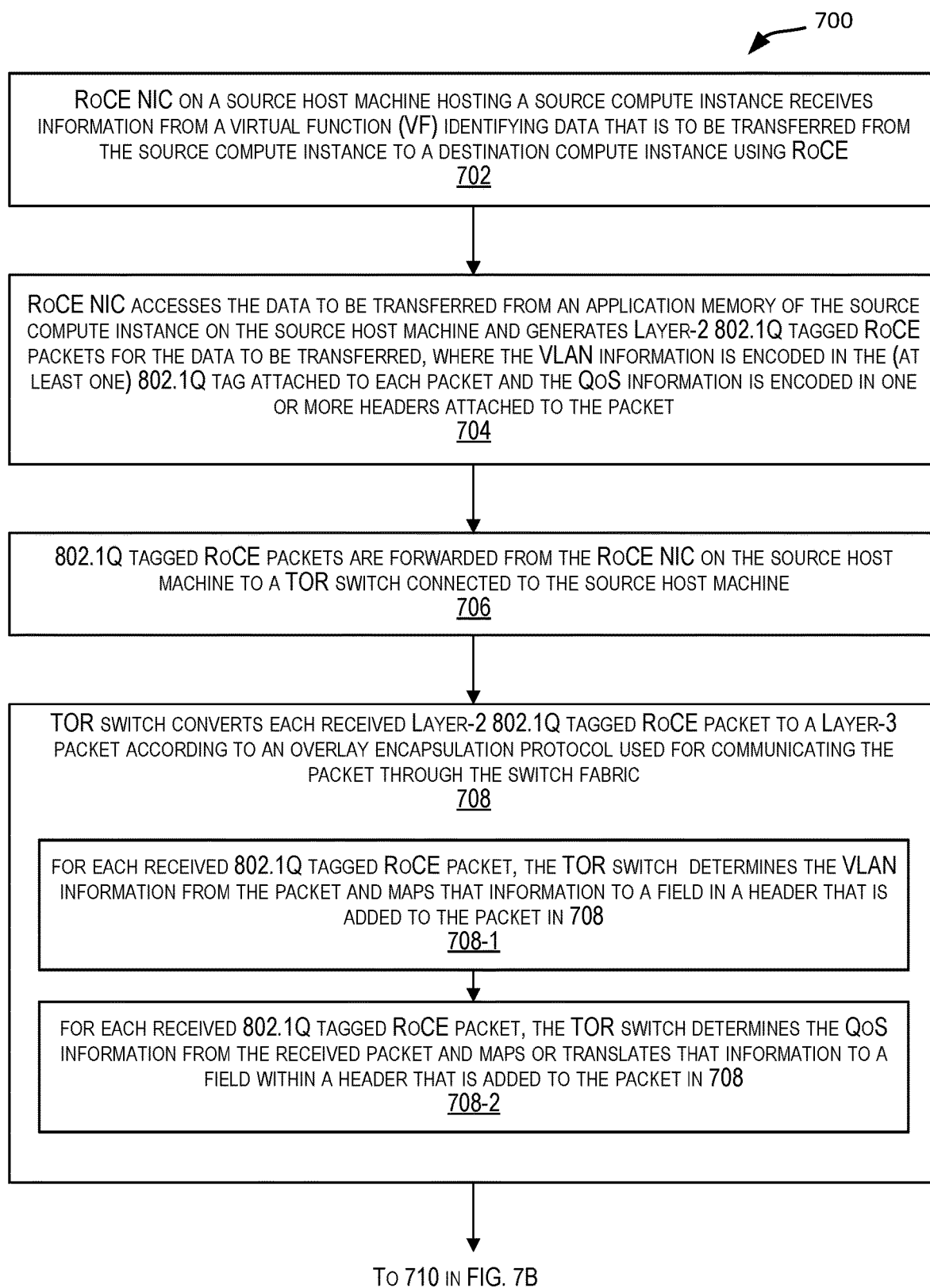
FIGS. 7A-7C show a simplified flowchart depicting processing for performing an RDMA data transfer from a source compute instance on a multi-tenant source host machine to a destination compute instance on a multi-tenant destination host machine over a shared Layer-3 switch fabric using Layer-3 routing protocols according to certain embodiments.
Figure 7B:
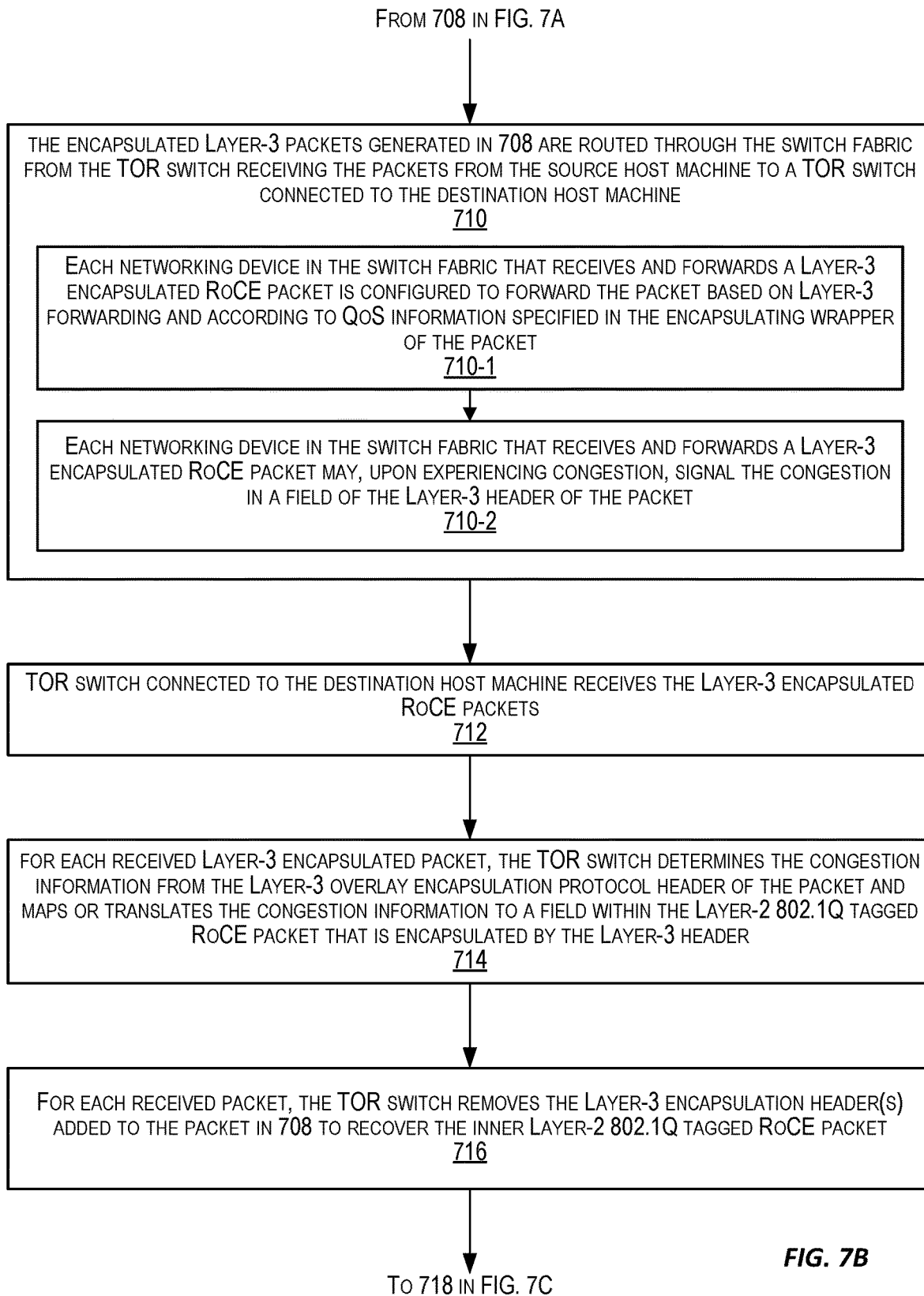
Figure 7C:
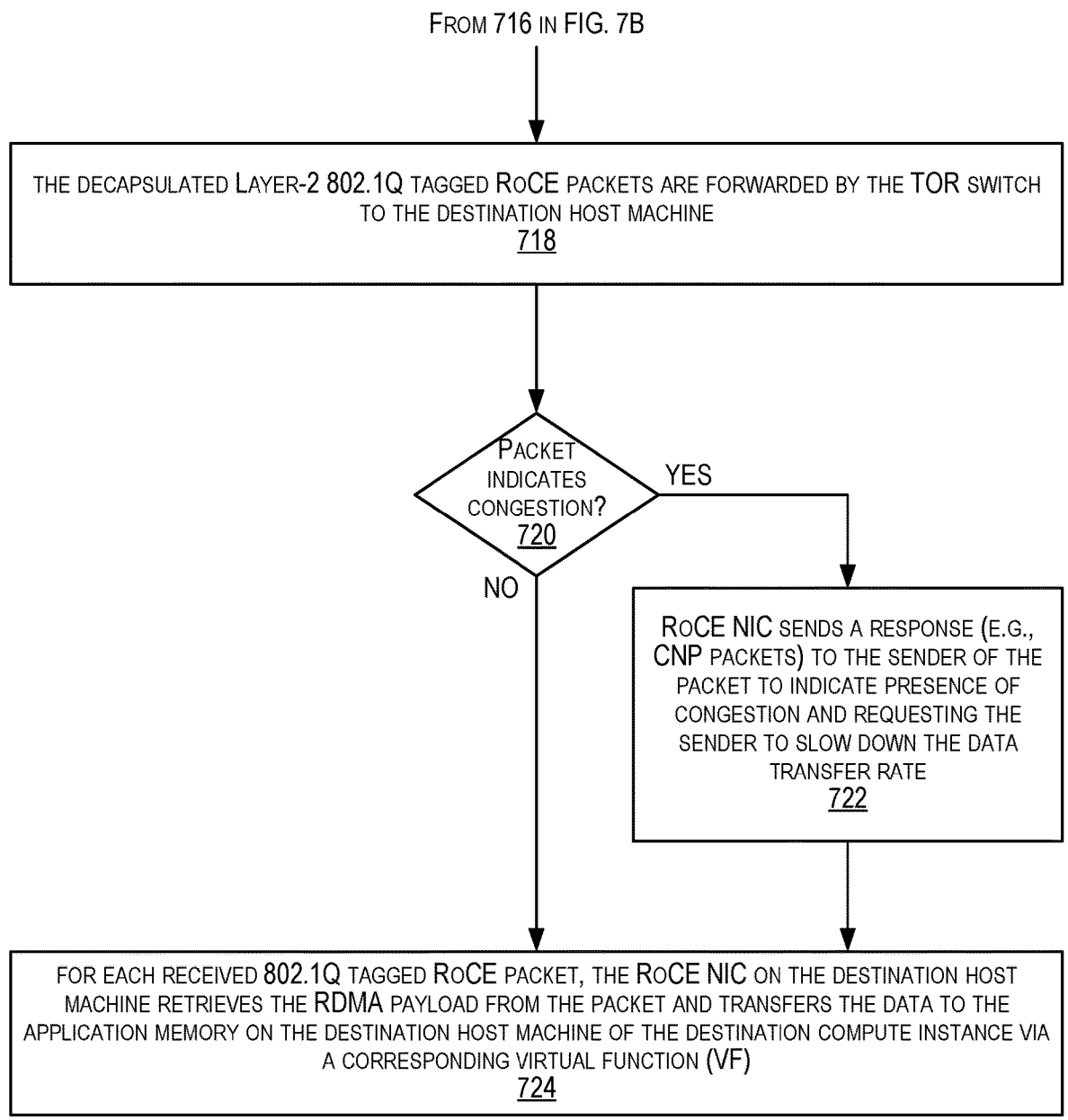

FIGS. 7A, 7B, and 7C present a simplified flowchart 700 depicting processing for performing an RDMA data transfer from a source compute instance on a multi-tenant source host machine to a destination compute instance on a multi-tenant destination host machine over a shared Layer-3 switch fabric using Layer-3 routing protocols according to certain embodiments. The processing depicted in FIGS. 7A-C may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 7A-C and described below is intended to be illustrative and non-limiting. Although FIGS. 7A-C depict the various processing steps occurring in a particular sequence or order, this depiction is not intended to be limiting. In certain alternative embodiments, the processing may be performed in some different order and/or some steps may also be performed in parallel. In certain embodiments, such as in the embodiment depicted in FIG. 6, the processing depicted in FIGS. 7A-C may be performed cooperatively by the RoCE NICs 608 and 628, the TOR switches 642 and 644, and one or more intermediate switches 646 of switch fabric 640. The method depicted in FIGS. 7A-C and described below may be used for different versions of RoCE, such as RoCEv2 and other future versions, as well as Layer-2 RDMA packets according to other RDMA protocols that support VLAN tagging.

For purposes of describing the method and as an example using the embodiment depicted in FIG. 6, it is assumed that data is to be transferred using RDMA and RoCE from compute instance A-1 604 hosted by host machine 602 to compute instance A-2 624 hosted by host machine 622, where A-1 and A-2 belong to the same customer A and are on the same VLAN 1001. The compute instance originating the data to be transferred (e.g., A-1 604) may be referred to as the source compute instance, and the host machine (e.g., host machine 602) hosting the source compute instance may be referred to as the source host machine. The compute instance to which the data is to be transferred (e.g., A-2 624) may be referred to as the destination or target compute instance and the host machine (e.g., host machine 622) hosting the destination compute instance is referred to as the destination or target host machine. Source and destination compute instances may be virtual machines or bare metal instances. The source and destination host machines may be in the same Ethernet domain or in different Ethernet domains.

At 702, a RoCE NIC on a source host machine hosting a source compute instance receives information (e.g., from a virtual function) identifying data that is to be transferred from the source compute instance to a destination compute instance using RDMA and RoCE. For example, the RoCE NIC may receive information identifying the source compute instance and a memory address range identifying a block of data to be transferred from the source compute instance to the destination compute instance. For the embodiment depicted in FIG. 6, RoCE NIC 608 may receive information that a block of data is to be transferred from compute instance A-1 604 hosted by host machine 602 to compute instance A-2 624 hosted by host machine 622.

At 704, the RoCE NIC accesses the data to be transferred from an application memory of the source compute instance on the source host machine and generates Layer-2 802.1Q tagged RoCE packets for the data to be transferred, where the VLAN information is encoded in a 802.1Q tag attached to each packet and the QoS information is encoded in one or more headers of the packet. Each Layer-2 802.1Q tagged RoCE packet may have one 802.1Q tag or more than one 802.1Q tag (e.g., 802.1ad or "Q-in-Q tagging" as described herein). The data may be accessed from the memory using a direct memory access (DMA) controller on the RoCE NIC, and the accessed data is then packetized by breaking it down in RDMA payload chunks for packets. For example, 1 megabyte (MB) of data may be marked for transfer from the source compute instance to a destination compute instance. The RoCE NIC may access this data from the application memory of the source compute instance and divide the data into chunks of 2 kilobytes (KB), where each chunk represents an RDMA payload to be transferred to the destination compute instance. Each payload is then packetized by the RoCE NIC to generate a RoCE Layer-2 packet (or "frame"). The packets are formatted according to the appropriate version of the RoCE protocol, such as RoCEv2 (or other RoCE protocol, or another RDMA protocol that supports VLAN tagging).

The RoCE NIC adds a 802.1Q tag to each RoCE packet, where the 802.1Q tag encodes information identifying the VLAN (e.g., the VLAN identifier) to which the source compute instance belongs. The 802.1Q protocol covers the use of VLANs and supporting VLANs on an Ethernet network. The 802.1Q protocol uses tags (referred to as 802.1Q tags) to demarcate traffic traversing a trunk and belonging to different VLANs.

In certain embodiments, the processing in 704 is performed cooperatively by the RoCE engine on the RoCE NIC and the virtual function on the RoCE NIC corresponding to the source compute instance. The RoCE engine is responsible for generating the RoCE packets. The RoCE engine may not have information identifying the VLAN identifier or the QoS information for the packet, which is to be encoded in the 802.1Q tags that are added to the packets. In certain embodiments, the virtual function corresponding to the source compute instance provides a particular VLAN identifier that indicates the VLAN of the source compute instance. This VLAN identifier is then encoded into an 802.1Q tag that is added to each packet. In certain implementations, the virtual function on a host machine is programmed by the hypervisor to enforce that the packets coming out from the RoCE NIC of the host machine towards the switch fabric network have 802.1Q VLAN tags. For example, for the embodiment depicted in FIG. 6, VF VF-A-1 612 may be implemented to enforce marking of RoCE packets from source compute instance A-1 604 with a VLAN ID that indicates VLAN 1001, and VF VF-B-1 614 may be implemented to enforce marking of RoCE packets from source compute instance B-1 606 with a VLAN ID that indicates VLAN 1002.

The QoS information may be encoded in one or more different portions of the 802.1Q tagged RoCE packet. In certain implementations, the QoS information is encoded in the DSCP bits of the IP header of each packet. In certain other embodiments, the QoS information may be encoded in the 802.1p bits in the Ethernet header of each packet. The QoS information generally includes information indicative of the priorities (or classes) for different traffic flows. The QoS information for a packet may specify a particular priority class for that packet which is to be used for forwarding/routing the packet to its destination. For example, the QoS information may contain information identifying the priority (e.g., high, low, etc.) assigned to the RoCE packet. The QoS information may also include other pieces of information, such as information specifying various parameters for each priority class relating to flow control, buffer allocation, queuing, scheduling, etc. In one example, the QoS information is provided by a compute instance that initiates the RDMA transfer.

FIG. 8A shows a RoCE packet format according to version 2 of the RoCE protocol (RoCEv2). As shown in FIG. 8A, a RoCEv2 packet 800 includes a 22-byte Ethernet header 801, a twenty-byte IP header 803, and an eight-byte UDP header 804. The Ethernet header 801 includes an eight-byte preamble field 816, a six-byte destination MAC address field 809, a six-byte source MAC address field 810, and a two-byte Ethertype field 811 whose value indicates that the header is attached to an IP packet. The UDP header 804 includes a value that indicates a destination port number of 4791, which specifies RoCEv2. The RoCEv2 packet 800 also includes a twelve-byte Infiniband (IB) base transport header 805, the RDMA data payload 806 (which may have a length of up to about 1400 bytes), a 32-bit RoCE end-to-end invariant cyclic redundancy check (ICRC) field 807, and a four-byte hop-by-Ethernet-hop frame check sequence (FCS) field 808. RoCEv2 is presented as an example only, and it is contemplated that the systems, methods, and apparatus described herein may likewise be implemented using, for example, one or more other protocols that support VLAN tagging of RDMA traffic.

As part of the processing in 704 for generating a RoCEv2 Layer-2 packet as depicted in FIG. 8A, the RoCE NIC on the host machine is configured to access the data to be transferred and prepare RDMA payload 806. The RoCE NIC is then configured to add headers 805, 804, 803, and 801 (and the check fields 807 and 808) to generate the RoCEv2 Layer-2 packet.

As described above, the virtual functions are programmed (e.g., by a hypervisor of the host) to enforce that RDMA packets outgoing to the fabric are tagged with an IEEE 802.1Q header (also sometimes referred to as a "VLAN tag") that identifies the VLAN on which the source compute instance of the packet is found. In certain embodiments, the VLANs are associated with separate customers or tenants, and thus the associated VLAN identifiers are used within the fabric to enforce traffic isolation between the different tenants at Layer 2. FIG. 8B shows a format of a 802.1Q VLAN-tagged RoCEv2 packet 820, which includes a four-byte VLAN tag 802 inserted between the source MAC address field 810 and the Ethertype field 811. The VLAN tag 802 includes a sixteen-bit tag protocol ID data field 812 having the value 0x8100, a three-bit user Priority Code Point (PCP) data field 813, a one-bit Drop Eligible Indicator data field 814, and a twelve-bit VLAN identifier data field 815 that identifies the VLAN. In certain implementations, the VLAN identifier for a packet is encoded in this VLAN identifier field 815. In certain embodiments, the PCP data field 813 (also called an "IEEE 802.1p" or "802.1p" data field) in VLAN tag 802 may be used to encode QoS information (e.g., traffic class priority information) for the packet.

In some other embodiments, the QoS information may be encoded in the DSCP bits of the IP header 803 of each packet. FIG. 9A shows a format of IP header 803, which includes an eight-bit version and header length data field 901, a six-bit Differentiated Services Code Point (DSCP) data field 902, a two-bit Explicit Congestion Notification (ECN) data field 903, a sixteen-bit length data field 904, a sixteen-bit identification data field 905, an sixteen-bit fragment flags and offset data field 906, an eight-bit time-to-live (TTL) data field 907, an eight-bit protocol data field 908, a sixteen-bit header checksum data field 909, a four-byte source IP address data field 910, and a four-byte destination IP address data field 911. In a RoCEv2 packet, the protocol data field 908 has a value which indicates that the header is attached to a UDP packet. The DSCP data field 902 may be used to carry QoS information for the packet. As described below in further detail, the ECN data field 903 may be used to indicate congestion information indicative of whether the packet has encountered congestion in its path from the source compute instance to the destination compute instance.

As previously described, the QoS information may be used to indicate a traffic class for the packet. For example, the QoS information may be used to specify different levels of traffic class priority for packets, where the priority associated with a packet is used to determine the priority with which the packet will be forwarded in the network path from the source host machine to the destination host machine. The priority specified for packets originating from one application may be different from the priority for packets originating from a different application. Generally, packets associated with an application that is more sensitive to network latency have a higher priority than packets associated with an application that is less sensitive to network latency. The QoS information for a packet may be specified by the compute instance which initiates the RDMA transfer (e.g., by an application executing on the compute instance). In one such example, the initiating compute instance may instruct the corresponding virtual function to perform an RDMA transfer according to a specified quality of service (QoS) (e.g., a specified traffic class), and the virtual function then causes the RDMA engine on a RoCE NIC to produce packets that include a VLAN tag identifying the VLAN of the source compute instance and also encode the specified QoS information in a data field (e.g., the 802.1p field or DSCP field) of the 802.1Q tagged RoCE packet.

A customer may use QoS values to indicate performance expectations. For example, a customer may specify a low QoS priority for the RoCE packets that carry a high-volume data transfer for a latency-tolerant application and/or may specify a higher value for QoS priority for RoCE packets that carry a low-volume data transfer for an application that is extremely latency-sensitive.

In another example, the value of a QoS data field is indicated by the type of RoCE transfer that is being performed (e.g., according to a predetermined mapping of QoS priority values to RDMA transfer types). RoCE packets carrying a high-volume data transfer may be tagged with a different QoS than RoCE packets carrying a low-volume data transfer that is extremely latency-sensitive, for example. Examples of high-volume transfers may include backups, reporting, or batch messages, while examples of low-latency critical transfers may include congestion information notifications, cluster heartbeat, transaction commits, cache fusion operations, and the like.

For example, in FIG. 6, if the packets represent data that is to be transferred via RDMA from compute instance A-1 604 to compute instance A-2 624 on VLAN 1001, RoCE NIC 608 generates Layer-2 802.1Q tagged RoCE packets for the data to be transferred, where each packet has a 802.1Q tag in which the VLAN ID field 815 of each packet encodes information identifying VLAN 1001. Additionally, the QoS information for each packet may be encoded in a DSCP field and/or a PCP field of the packet.

The 12-bit VLAN tag field defined in the IEEE 802.1Q standard can identify a maximum of 4096 VLANs. The 802.1ad Q-in-Q standard (also called "802.1q-in-802.1q" or "Q-in-Q-tagging" or "Q-in-Q standard") was developed to expand the number of VLANs beyond 4096. According to the Q-in-Q standard, two (or more) 802.1Q VLAN tags can be appended to a packet. The two tags, referred to as inner tag and outer tag, can be used for various different purposes (e.g., the inner tag may represent additional security rules). For example, in some embodiments, the inner and outer tags can be used to support application-specific network enforcements. It may be desired to differentiate between packets based upon tenants and applications, where the one tag corresponds to the tenant and the other tag corresponds to a particular one of the tenant's applications. In one such example, a host machine that is configured to execute multiple compute instances for the same customer on the same service VLAN may use a customer VLAN tag to segregate traffic across the multiple compute instances on the service VLAN. Alternatively or additionally, a host machine that is configured to execute multiple applications for the same customer on the same service VLAN may use a customer VLAN tag to segregate traffic across the multiple applications on the service VLAN. Accordingly, in certain situations, as part of the processing performed in 704, the RoCE NIC may append two tags to each RoCE packet according to the Q-in-Q standard. For example, in the situation where a tenant has different applications, such as Tenant A having a simulation application and a backup application, two separate 802.1Q tags may be appended to the RoCE packet, one with the VLAN ID identifying the tenancy (e.g., Tenant A) and a second one with the VLAN ID identifying the application (e.g., simulation, backup).

An example of a Q-in-Q-tagged RoCEv2 packet 830 is depicted in FIG. 8C. In such cases, each packet includes a second VLAN tag 822 (also referred to as "inner" VLAN tag, a "private" VLAN tag, or a customer-VLAN (C-VLAN) tag) in addition to the first VLAN tag 802 (also referred to as an "outer" VLAN tag, a "public" VLAN tag, or a service-VLAN (S-VLAN) tag). One or more additional VLAN tags may be added to a Q-in-Q-tagged RoCEv2 packet in the same manner.

Referring back to FIG. 7A, at 706, the 802.1Q tagged RoCE packets are forwarded from the RoCE NIC on the source host machine to a TOR switch connected to the source host machine. The TOR switch receiving the 802.1Q tagged RoCE packets may also be referred to as the ingress TOR switch, since it represents the ingress edge device for the switch fabric. The TOR switch represents the lowest tier (or leaf-level) networking device of the switch network or fabric that is to be used for forwarding the packets from the source compute instance on the source host machine to the destination compute instance on the destination host machine. For example, in FIG. 6, the 802.1Q tagged RoCE packets generated by RoCE NIC 608 are communicated to TOR switch 642, where the TOR switch 642 is a tier-0 switch in the switch fabric 640.

While the embodiment in FIG. 6 and the flowchart in FIGS. 7A-C describe the processing performed by TOR switches, this example is not intended to be limiting. In general, the RoCE packets may be communicated from the source host machine to a networking device that provides Layer-2 functionality (e.g., a switch), provides Layer-3 functionality (e.g., a router), or provides both Layer-2 and Layer-3 functionality. For example, the TOR switches 642 and 644 depicted in FIG. 6 may provide both Layer-2 and Layer-3 functionality. Typically, the networking device receiving the RoCE packets from the source host machine is an edge device of the switch fabric that is used for transferring data from the source host machine to the destination host machine.

The source host machine 602 may be connected to TOR switch 642 via an Ethernet cable (e.g., copper, fiber optic, etc.). In certain embodiments, the packets arrive at a trunk port of TOR switch 642. The trunk port may allow packets belonging to multiple VLANs to come in, while traffic segregation is done with the VLAN information encoded in the packets. For example, RoCE packets representing data to be transferred from compute instance A-1 604 will be tagged with a tag identifying VLAN 1001 while RoCE packets representing data to be transferred from compute instance B-1 606 are tagged with a tag identifying VLAN 1002.

At 708, the ingress TOR switch receiving the packets (e.g., TOR switch 642) converts each Layer-2 802.1Q tagged RoCE packet that is to be forwarded via intermediate switches 646 into a Layer-3 packet, where a format of the Layer-3 packet is based upon a particular overlay encapsulation protocol (OEP) that is used for communicating the packets through the switch fabric. Various different overlay encapsulation protocols may be used for communicating the RoCE packets over the switch fabric, such as, for example, Virtual Extensible LAN (VxLAN), Network Virtualization using Generic Routing Encapsulation (NVGRE), Generic Networking Virtualization Encapsulation (GENEVE), MPLS, Stateless Transport Tunneling (STT), and others. For example, for the embodiment in FIG. 6, ingress TOR switch 642 receives 802.1Q tagged RoCE packets from RoCE NIC 608 and converts each packet as described in 708 by encapsulating the packet. The encapsulating is performed by adding, to the packet, a wrapper corresponding to the overlay encapsulation protocol to be used for communicating the packet over the Layer-3 switch fabric using Layer-3 routing protocols, where the wrapper includes one or more headers. (For completeness, it is noted that in some environments that implement method 700, an ingress TOR switch may receive 802.1Q tagged RoCE packets from a source compute instance that are directed to a destination compute instance in the same rack as the source compute instance. In such cases, the ingress TOR switch may forward the packets by Layer-2 transport to the destination compute instance (e.g., via the respective RoCE NIC) without being processing them at 708 et seq.)

As part of the processing in 708, ingress TOR switch 642 generates the appropriate one or more headers corresponding to the overlay encapsulation protocol being used and adds a wrapper that includes the header(s) to each received Layer-2 802.1Q tagged RoCE packet to convert the packet to a Layer-3 packet, where the overlay encapsulation protocol headers added to the packet are visible to the networking devices in switch fabric 640. The Layer-2 frames are converted to Layer-3 packets to enable the packets to be routed from TOR switch 642 connected to source host machine to the TOR switch 644 connected to the destination host machine 622, where the routing occurs over a Layer-3 switch fabric 640 and using Layer-3 routing protocols, which are more robust and scalable than Layer-2 forwarding protocols.

As part of the processing performed in 708, at 708-1, for each received 802.1Q tagged RoCE packet, TOR switch 642 determines the VLAN information from the received packet and maps or translates that information to a field (or fields) within a wrapper that is added to the packet in 708. In this manner, the VLAN identifier information is mapped to a Layer-3 header that is added to the packet in 708 and that is visible to the various networking devices in switch fabric 640. The Layer-3 packet includes at least one outer header that is added to the Layer-2 packet in 708.

For example, if the VxLAN protocol is used as the Layer-3 encapsulation protocol for communicating a packet through switch fabric 640, then in 708, the Layer-2 802.1Q packet is converted to a VxLAN packet by adding a VxLAN header (among other fields of the VxLAN wrapper) to the received packet in 708. As part of this operation, at 708-1, TOR switch 642 determines the VLAN identifier information encoded in the 802.1Q tag of the packet and maps (or encodes) that information to a field within the VxLAN header that is added to the packet in 708. In certain implementations, the VLAN information in the 802.1Q tag of the RoCE packet is mapped (e.g., according to a VNI-VLAN map) to a corresponding unique VNI that is copied to the VNI field within the VxLAN header that is added to the packet. In this manner, the VLAN identifier information in the 802.1Q tag, which may also identify a specific tenant, is included or carried forward to a corresponding identifier in an overlay encapsulation protocol header of the packet.

For a case in which the RoCE packet has more than one VLAN tag (e.g., the Q-in-Q-tagged RoCE packet 830), the TOR switch 642 maps the VLAN ID in the outer tag of the RoCE packet to the corresponding VNI according to a VNI-VLAN map. The VNI-VLAN map, which may be stored in a memory of the TOR switch 642 (e.g., as a table), is a one-to-one correspondence between the VNIs assigned on the TOR switch 642 and the VLANs to which they are assigned. VLANs only have local significance on a switch, so that the same VLAN ID may be mapped to a different VNI elsewhere in the fabric (although for convenience, it may be desired to use the same VNI-VLAN mapping at multiple switches in the fabric) and/or the same VNI may be mapped to a different VLAN ID elsewhere in the fabric (e.g., another VLAN ID that is assigned to the same tenant). The VNI is copied into a corresponding data field of the at least one outer header of the corresponding Layer-3 encapsulated packet (e.g., the encapsulation protocol header), thereby extending the multi-tenancy across the L3 network boundary. For a case in which the overlay encapsulation protocol is VxLAN (or GENEVE), the VNI is carried in a 24-bit VNI field of the VxLAN (or GENEVE) header of the Layer-3 encapsulated packet. For a case in which the overlay encapsulation protocol is NVGRE, the VNI is carried in a 24-bit virtual subnet ID (VSID) field of the NVGRE header of the Layer-3 encapsulated packet. For a case in which the overlay encapsulation protocol is STT, the VNI is carried in a 64-bit context ID field of the STT header of the Layer-3 encapsulated packet.

Additionally, as part of the processing in 708, at 708-2, for each received 802.1Q tagged RoCE packet, TOR switch 642 determines the QoS information from the received packet and maps or translates that information to a field (or fields) within a header that is added to the packet in 708. In this manner, the QoS information is mapped to a part of the wrapper that is added to the packet in 708 (e.g., an outer header) which is visible to the various networking devices in switch fabric 640.

For example, if the VxLAN protocol is used as the Layer-3 encapsulation protocol for communicating a packet through switch fabric 640, then in 708, the Layer-2 802.1Q packet is converted to a VxLAN packet by adding a VxLAN envelope or wrapper (including a VxLAN header and several outer headers) to the received packet in 708. As part of this operation, at 708-2, TOR switch 642 determines the QoS information encoded in the received packet and maps (or encodes) that information to a field within the VxLAN wrapper that is added to the packet in 708. As described above, depending upon the implementation, the QoS information may be encoded in one or more different portions of a received Layer-2 packet. For example, the QoS information may be encoded in the PCP or 802.1p bits of the 802.1Q tag and/or may be encoded in the DSCP field of the Ethernet header of the received Layer-2 packet. As part of 708-2, TOR switch 642 determines this QoS information and maps or translates it to a field (or fields) within the VxLAN wrapper that is added to the packet in 708. In certain implementations, the QoS information from the RoCE packet is mapped to a DSCP field in an outer IP header of the VxLAN wrapper. In this manner, the QoS information in the Layer-2 802.1Q tagged RoCE packet is included or carried forward to the Layer-3 wrapper of the VxLAN packet in a manner that makes it visible to the various networking devices in switch fabric 640.

Figure 10:
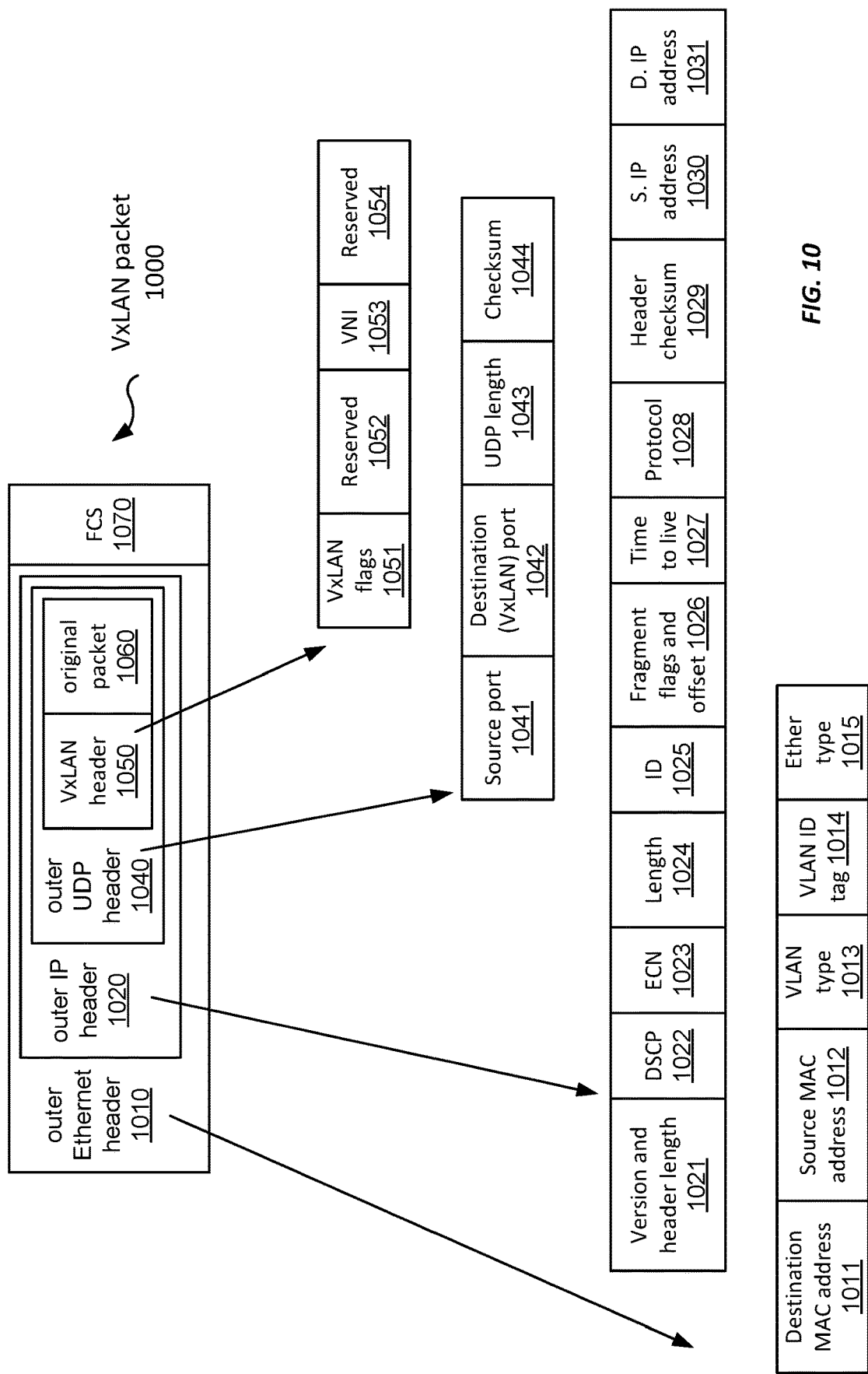
FIG. 10 shows a format of a VxLAN packet according to certain embodiments.

FIG. 10 shows a format of a Layer-3 encapsulated packet 1000 as produced by an ingress TOR switch that applies VxLAN as the OEP (also called a VxLAN packet). As depicted in FIG. 10, the VxLAN packet 1000 includes an outer Ethernet header 1010, an outer IP header 1020, an outer UDP header 1040, a VxLAN header 1050, the original packet (e.g., a RoCEv2 packet) 1060, and a frame check sequence (FCS) 1070. In the processing performed in 708, when VxLAN is the overlay encapsulation protocol, as part of encapsulating the 802.1Q tagged RoCE packet, the TOR switch puts a VxLAN header 1050 outside on the "original" 802.1Q tagged RoCE packet, then puts an outer UDP header 1040 outside the VxLAN header, then puts an outer IP header 1020 outside the outer UDP header, and then adds an outer Ethernet header 1010 on top of the outer IP header.

The outer Ethernet header 1010 includes a destination MAC address field 1011, a source MAC address field 1012, (optionally) a VLAN type field 1013, (optionally) a VLAN ID tag 1014, and an Ethertype field 1015 that carries the value 0x0800. The outer IP header 1020 includes an eight-bit version and header length data field 1021, a six-bit DSCP data field 1022, a two-bit ECN data field 1024, a sixteen-bit length data field 1024, a sixteen-bit identification data field 1025, an sixteen-bit fragment flags and offset data field 1026, an eight-bit time-to-live (TTL) data field 1027, an eight-bit protocol data field 1028 that carries the value 17 (indicating UDP), a sixteen-bit header checksum data field 1029, a four-byte source IP address data field 1030 that indicates the IP address of the ingress TOR switch, and a four-byte destination IP address data field 1031 that indicates the IP address of the egress TOR switch. The outer UDP header 1040 includes a source port field 1041 that may carry a value that is a hash of information from the original RDMA packet, a destination (VxLAN) port field 1042 that carries the value 4789, a UDP length field 1043, and a checksum field 1044. The VxLAN header 1050 includes an eight-bit flags field 1051, a 24-bit VNI field 1053 that carries the VNI, and two reserved fields 1052 and 1054.

As part of creating a Layer-3 VxLAN packet by encapsulating the "original" 802.1Q tagged RoCE packet in 708, the TOR switch encodes the VLAN ID information (e.g., tenancy information), the QoS information (e.g., traffic class), and congestion information from the original packet into various fields of one or more of the headers added to the original 802.1Q tagged RoCE packet. For example, in certain implementations, the VLAN ID field is mapped to a VNI and carried in VNI field 1053, the QoS information from the RoCE packet is copied to (or mapped to a value and carried in) DSCP field 1022 in IP header 1020, and congestion may be signaled by setting a bit (referred to as the ECN bit) in ECN field 1023. In this manner, the QoS information in the DSCP data field of the IP header of the RoCE packet (e.g., from DSCP field 902 in FIG. 9) may be copied or otherwise mapped to the DSCP data field 1022 of an outer IP header 1020 of the encapsulated VxLAN packet. In embodiments where the QoS information in the RoCE packet is encoded in the PCP data field 813 of the 802.1Q tag of the RoCE packet, that information may also be mapped to the DSCP data field 1022 of the outer IP header 1020 of the VxLAN packet.

Accordingly, in 708, an overlay encapsulation protocol wrapper is added to the RoCE packet, and the VLAN ID and QoS information from the RoCE packet is mapped to and encoded in the overlay encapsulation protocol wrapper in a manner that is visible to devices in the switch fabric. Referring to FIG. 7B, at 710, the encapsulated Layer-3 packets generated in 708 are routed through the switch fabric, from the TOR switch receiving the packets from the source host machine to a TOR switch connected to the destination host machine. In certain embodiments, the packet is forwarded and sent down a tunnel (e.g., a VxLAN tunnel if VxLAN overlay encapsulation protocol is used) that takes the packet through the switch fabric from the TOR switch connected to the source host machine to the TOR switch connected to the destination host machine. The path taken by the packet in the switch fabric may traverse multiple networking devices, with each device configured to receive the packet via an ingress port of the networking device and to forward the packet via an egress port of the networking device to the next-hop networking device so as to facilitate communication of the packet to the TOR switch connected to the destination host machine. For example, in the embodiment depicted in FIG. 6, the encapsulated Layer-3 packets are forwarded from TOR switch 642 to TOR switch 644 via one or more intermediate switches 646 of switch fabric 640.

By translating the VLAN ID and QoS information from the Layer-2 802.1Q RoCE packet to information that is carried in the wrapper of a Layer-3 encapsulated packet in 708, the VLAN information (e.g., tenancy information) and QoS information is now visible to the switches and networking devices in switch fabric 640 for routing the packets using Layer-3 routing protocols. As part of the processing in 710, each networking device in switch fabric 640 that receives and forwards a Layer-3 encapsulated RoCE packet, including TOR switches 642 and 644, is configured to, at 710-1, forward the packet based on Layer-3 forwarding and according to the QoS information specified in the encapsulating wrapper of the packet. In certain implementations, each networking device receiving a packet may have multiple RDMA data queues corresponding to different QoS priority levels. Upon receiving a packet, the networking device is configured to determine QoS information for the packet from one or more fields of the encapsulating wrapper (or from the Layer-2 headers, for the first TOR switch that receives the packet) and to queue the packet in an RDMA data queue corresponding to the priority level specified by the QoS information. The packet is then dequeued and forwarded from the networking device according to the particular priority of the queue. The multiple RDMA data queues may be implemented using, for example, one or more buffers, and the networking device may also include enqueuing logic configured to distribute incoming packets among the multiple queues according to the specified priority level (e.g., traffic class) and dequeuing logic configured to service the multiple queues according to a desired scheduling scheme (e.g., weighted round-robin scheduling and/or strict priority scheduling). When using merchant silicon to implement a networking device, it may be desired to make the best use of relatively low amounts of buffers. For example, it may be desired to repurpose unused buffers (e.g., from queues that are not otherwise being used) for use as at least part of the multiple queues. For example, it may be desired to implement at least part of the environment 600 (e.g., TOR switches 642 and 644, switch fabric 640) to exclude support for multicast traffic, and in such case buffers previously assigned to store multicast traffic may be reprogrammed as storage for the multiple queues instead.

As part of 710, in 710-2, each networking device in the switch fabric that receives and forwards a Layer-3 encapsulated RoCE packet may, upon experiencing congestion, signal the congestion by marking a field of an outer header of the Layer-3 encapsulating wrapper of the packet. In certain embodiments, a mechanism called Explicit Congestion Notification (ECN), which is an IP protocol concept, is used by the RoCE protocol to specify congestion information. Per this mechanism, an ECN bit in the IP header of the packet is used to specify or encode congestion information. Accordingly, as part of the processing in 710-2, if a networking device receiving and forwarding a packet detects congestion (e.g., detects that a buffer occupancy exceeds a threshold), that networking device can signal the congestion by setting the ECN bit in the outer IP header of the overlay encapsulation protocol wrapper of the packet. For example, if VxLAN is the overlay encapsulation protocol, then a bit in ECN field 1023 of the outer IP header 1020 may be set by that networking device (e.g., if the bit has not been set already) to signal congestion.

In this manner, as the packet travels through the switch fabric, the congestion information is included and updated in the packet and is carried with the packet to the packet's destination. For example, in the embodiment depicted in FIG. 6, as a packet travels through a series of networking devices in switch fabric 640 as it travels from source host machine 602 to destination host machine 622, any of the networking devices through which the packet traverses can signal congestion by setting a congestion bit (e.g., a bit in the ECN field of an outer IP header) in the Layer-3 encapsulating wrapper of the packet. The series of networking devices includes TOR switch 642, TOR switch 644, and any intermediate switch 646 in the path traversed by the packet.

The indication or marking of congestion in the packet may be done by any of the networking devices in the switch fabric that route the packet from the source host machine to the destination host machine. The egress TOR copies the ECN bit from the Layer-3 wrapper to the IP header of the inner packet, and the inner packet is sent as Layer-2 to the destination host machine. In this manner, the congestion information is carried in the packet all the way to the destination host machine. The congestion information is carried across the boundaries of the Layer-2 network, including the source and destination compute instances and host machines, and the Layer-3 network, including the TOR switches and intermediate switches in the switch fabric.

Traditionally, RoCE relies on a Layer-2 Priority Flow Control (PFC), or ECN, or a combination of PFC and ECN for congestion control. It may be desired to implement the TOR switches (e.g., TOR switches 642 and 644) to perform Priority Flow Control (PFC). When a receive buffer of a PFC-enabled switch fills to a threshold level, the switch sends a PAUSE frame for a corresponding priority class back to the sender. PFC provides for a maximum of eight priority classes, and it may be desired to implement the switch to use the PCP value of the packet at the head of the receive buffer as the priority class indicated by the PAUSE frame (alternatively, to use a mapping of the DSCP value of the packet to the priority class indicated by the PAUSE frame).

It may be desired to implement congestion control on a per-application basis, such that congestion control to pause RDMA traffic of one customer does not pause RDMA traffic of another customer. Because PAUSE frames cause the sender to pause all traffic of the indicated priority class and thus have the potential to affect multiple customers, it may be desired to configure each TOR switch to prevent any PAUSE frames from traveling beyond the fabric side of the TOR switch. For example, it may be desired to limit PFC to the host-facing interface of each TOR switch 642 and 644 (e.g., by configuring each input port of the TOR switch to pass PAUSE frames only down to a host or to another input port of the TOR switch). Containing PAUSE frames locally in this manner may help to avoid congestion spread in large fabrics and/or to avoid live lockups.

At 712, the TOR switch (also referred to as the egress TOR switch, since it represents the egress edge device of the switch fabric) connected to the destination host machine receives the Layer-3 encapsulated RoCE packets. For example, in the embodiment depicted in FIG. 6, egress TOR switch 644 receives the packets.

At 714, for each received Layer-3 encapsulated packet, the TOR switch determines the congestion information from the Layer-3 overlay encapsulation protocol wrapper of the packet and maps or translates the congestion information to a field within the Layer-2 802.1Q tagged RoCE frame that is encapsulated by the Layer-3 wrapper. In this manner, for each Layer-3 encapsulated RoCE packet received by the egress TOR switch, the congestion information that may have been signaled by one or more networking devices (e.g., TOR switch 642, one or more intermediate switches 646) along the path traversed by the packet in the switch fabric, and which is encoded in a field (e.g., ECN field) of a header of the Layer-3 overlay encapsulation protocol wrapper, is mapped to and retained in a header of the 802.1Q tagged RoCE Layer-2 frame. In certain implementations, the congestion information determined from the Layer-3 wrapper (e.g., from ECN field 1023 in IP header 1020 of the VxLAN packet) is copied to the ECN field of the IP header of the Layer-2 802.1Q tagged RoCE frame (e.g., ECN field 903 depicted in FIG. 9).

At 716, for each received Layer-3 encapsulated RoCE packet, the egress TOR switch decapsulates the packet by removing the encapsulating wrapper added to the packet in 708 (e.g., outer Ethernet header 1010, outer IP header 1020, outer UDP header 1040, VxLAN header 1050, and FCS 1070), recovering the inner Layer-2 802.1Q tagged RoCE packet. For example, if a VxLAN wrapper was added to a packet, then that wrapper is removed in 714 to leave a 802.1Q tagged RoCE packet. Since the congestion information is mapped to a header of the 802.1Q tagged RoCE packet in 714, the congestion information in the Layer-3 overlay encapsulation protocol wrapper is not lost as a result of the decapsulation of the Layer-3 encapsulated packet. The mapping (e.g., copying) of congestion information in 714 may be performed before, during, or after the decapsulating in 716.

As part of the processing in 716, in addition to translating the congestion information from the Layer-3 overlay encapsulation protocol wrapper to a header within the Layer-2 802.1Q tagged RoCE packet, egress TOR switch 644 may itself may, upon experiencing congestion, set the ECN congestion bit to signal congestion.

Referring to FIG. 7C, at 718, the decapsulated Layer-2 802.1Q tagged RoCE packets are forwarded by the egress TOR switch to the destination host machine. For example, in the embodiment in FIG. 6, the RoCE packets decapsulated by TOR switch 644 are forwarded to destination host machine 622. On the destination host machine, the packets are received and processed by the RoCE NIC on the destination host machine.

At 720, for each received 802.1Q tagged RoCE packet, the RoCE NIC on the destination host machine checks if congestion is signaled in a header of the received packet. For example, congestion may be signaled if an ECN bit of the IP header of the packet is set. If it is determined in 720 that the packet indicates congestion, then, in 722, the RoCE NIC sends a response to the sender of the packet (e.g., to the RoCE NIC on the source host machine) indicative of the congestion and requesting the sender to slow down the data transfer rate. In certain implementations using the ECN protocol, the response is in the form of Congestion Notification Packets (CNP packets) that are sent from the RoCE NIC on the destination host machine to the RoCE NIC on the source host machine. For example, Data Center Quantized Congestion Notification (DCQCN) may be implemented in the RoCE NICs (e.g., the RDMA NIC cards and corresponding software drivers) to use the ECN information to do a flow control by sending CNP packets to let the sender know about the congestion. These CNP packets indicate to the source host machine that there is congestion in the network and request the source host machine to slow down the rate at which it is sending RoCE packets. The CNP packets are sent to the appropriate sender identified from the information in the received Layer-2 RoCE packet (e.g., source MAC address and/or source IP address). Upon receiving such notifications, in response, the sender (e.g., the RoCE NIC on the source host machine) may throttle down the transmission of RoCE packets accordingly. Further details related to CNP packets and how they are communicated from the destination host machine to the source host machine are provided below.

In certain implementations, the sender may use an algorithm that calculates a percentage reduction in the data transmission rate. For example, upon receiving a first CNP packet, the sender (e.g., the RoCE NIC on the source host machine) may cut its transmission rate by a certain percentage. Upon receiving another CNP packet, it may further cut its transmission rate by an additional percentage amount, and so on. In this manner, the sender may perform adaptive rate control in response to receiving the CNP packets.

At 724, for each received 802.1Q tagged RoCE packet, the RoCE NIC on the destination host machine retrieves the RDMA data payload from the packet and transfers the data to the application memory on the destination host machine of the destination compute instance via a corresponding virtual function (VF). In certain embodiments, the virtual function on the RoCE NIC corresponding to the destination compute instance is configured to control a RoCE engine of the RoCE NIC to transfer the RDMA data payload to a memory space of the destination compute instance by way of DMA transfer to the application memory of the destination host machine. This operation completes the RDMA data transfer from the source compute instance to the destination compute instance.

As described above, the VLAN identifier, which may identify a tenant, is included in the 802.1Q tag that is added to the RoCE packet: for example, in the VLAN ID field of the 802.1Q tag. The VLAN ID or tenancy information is also mapped to a VNI included in the Layer-3 overlay encapsulation protocol wrapper that is added to the 802.1Q tagged RoCE packet by the TOR switch connected to the source host machine. Mapping the VLAN identifier (or tenancy information) to an identifier in a field of the Layer-3 encapsulating wrapper makes the tenancy information visible to the networking devices in the Layer-3 switch fabric. These networking devices use this information to segregate the traffic belonging to different customers or tenants.

The QoS information associated with a packet is also preserved from the RoCE NIC on the source host machine all the way to the RoCE NIC on the destination host machine. The QoS information encoded in a Layer-2 RoCE packet is made visible to the networking devices in the switch fabric by encoding that information in the Layer-3 overlay encapsulation protocol wrapper that is added to the 802.1Q tagged RoCE packet by the ingress TOR switch. This enables the networking devices in the switch fabric to route RoCE traffic through the switch fabric using Layer-3 routing protocols and according to the QoS information associated with each packet.

Any of the networking devices in the switch fabric can signal congestion on a per-packet basis. This congestion information is preserved in a packet as the packet travels through the switch fabric from the TOR connected to the source host machine to the TOR connected to the destination host machine. At the TOR switch connected to the destination host machine, the congestion information from the Layer-3 encapsulating wrapper is translated (e.g., copied) to the RoCE packet header (e.g., to the ECN bits in the IP header of the RoCE packet) and thus preserved and made available to the destination host machine. The destination host machine can then respond to the congestion information by sending CNP packets.

Congestion Notification Information Routing

RDMA data transfers are generally very sensitive to network latency that may be caused by congestion in the switch fabric network. The RDMA Congestion Notification Packets (CNP packets) are exceptionally critical in that they help signal the RDMA Congestion Management (Flow Control). As such, they are extra sensitive to packet loss and network latency while they do not require large network bandwidth. Accordingly, the CNP packets, which are sent by the destination host machine in response to congestion being indicated by a received packet, are given high priority so that they reach the source host machine with minimal latency and can inform the sender to slow down the transmission of data so as to minimize or avoid loss of data packets due to the congestion. Additionally, the priority queuing for the CNP packets is such that the likelihood of the CNP packets themselves being dropped due to congestion is minimized.

In order to achieve this, Congestion Notification Packet traffic (CNP traffic) is assigned a high priority such that, at each networking device in the switch fabric as the CNP packet travels from the destination host machine to the source host machine, the CNP packet is assigned to a queue with a very high priority. In certain implementations, the CNP traffic is assigned to the second highest queue on each networking device in the switch fabric (e.g., second only to a network control queue).

Additionally, a strict priority queueing technique is used for the CNP packets. According to strict priority queuing, traffic that is assigned to a strict priority queue gets to starve other traffic. For example, if a networking device in the switch fabric has a packet from Tenant #1, a packet from Tenant #2, and a CNP packet, and if the networking device can only send out one packet, then Tenant #1 and Tenant #2 packets will be queued and the CNP packet will be sent instead. In certain implementations, a CNP packet is configured with QoS information which indicates that special class for the CNP packet and that a strict priority queue is to be used for queueing the packet for transmission.

However, in a strict queuing implementation. care has to be taken that strict priority queuing does not indefinitely starve other traffic. Accordingly, a limit may be applied to how much CNP traffic will be allowed to travel through the switch fabric. In certain implementations, this limit is a small fraction of the total bandwidth of the link. For example, a dedicated strict priority queue may be allocated to the CNP traffic, with a low bandwidth guarantee such that it does not starve the actual RDMA traffic classes. As a result, if a situation arises that a malicious or misconfigured application begins to generate a large number of CNP packets, which could result in the CNP traffic starving other traffic (e.g., the RDMA data traffic), the limit threshold minimizes the impact of this problem on the other traffic.

Feedback delay arises between the time at which an ECN-enabled device marks a packet and the time at which the sender receives the resulting CNP packet. In a worst case, such delay can lead to congestion collapse, which has been a long-standing problem in high-performance networks. In order to avoid lengthy feedback loops between ECN marking by the switches and CNP reflection by the receiving hosts and then RDMA congestion management action by the sending hosts, it may be desired to configure the networking devices of the switch fabric 640 with a low and deterministic ECN marking threshold. For example, it may be desired to configure each of the TOR switches and intermediate switches to mark every packet once congestion has been detected. An aggressive ECN marking policy ensures that the switches start ECN marking at the first hint of network congestion, providing a tight loop for congestion management and helping to protect the network from congestion collapse.

Queue-Based Routing to Avoid Head-of-Line Blocking

As described above, the QoS information associated with a packet is used by the networking devices in the switch fabric to route the packet using Layer-3 routing protocols. The QoS information may identify a specific priority or class. A networking device in the switch fabric (e.g., any one or more (or all) of TOR switch 642, TOR switch 644, and the intermediate switches 646) may use this priority information to identify a specific priority queue, from among multiple queues used by the networking device, to be used for forwarding the packet. For example, the networking device may maintain a set of queues, with individual queues for individual different priority classes. Packets corresponding to different customers or tenants may have different assigned priorities or classes, and as a result, the differently classed packets may be allocated to different queues on a networking device in the switch fabric. Due to the packets for different classes (e.g., different tenants, different applications) being allocated to different queues on a networking device in the switch fabric, the congestion that may result from the traffic for one class (e.g., one tenant) does not impact the traffic for the other class (e.g., another tenant). In certain embodiments, it is also possible for RDMA packet flows from different tenants to be allocated to the same queue of a networking device (e.g., in accordance with their same assigned priority class) and/or for RDMA packet flows from the same tenant (e.g., packet flows from different applications of the tenant) to be allocated to different queues of a networking device (e.g., in accordance with their different respective assigned priority classes).

In certain embodiments, to avoid head-of-line blocking problems, multiple queues are used on the networking device for handling RDMA/RoCE traffic. Providing multiple queues for RDMA data traffic avoids queueing all of the RDMA/RoCE traffic in a single queue, which may lead to congestion. Multiple (e.g., four) RDMA queues also allows for multiple different applications needing different levels of performance, while all of these classes need lossless networking. In such manner, the environment may provide a dedicated network path for latency-sensitive RDMA applications throughout the fabric at cloud scale and may do so while avoiding HOL blocking issues. Each of the core network queues may support a configurable weighted bandwidth distribution.

In some cases, the customer or tenant, via the QoS information set for a packet, can control which priority queue is to be used for routing their traffic. In certain implementations, on a networking device in the switch fabric having multiple queues (e.g., a plurality of queues) for transmission of packets, a percentage of the queues are set aside for RDMA traffic. For example, in one implementation, if a switch in the switch fabric has eight queues, six of the queues may be set aside for RDMA traffic. These RDMA queues may be weighted-round-robin queues that each get a share of the network bandwidth but cannot starve each other (e.g., in order to provide fairness across the RDMA applications). In one such scheme, each of the RDMA queues is equally weighted, so that each of the RDMA queues is serviced once per dequeueing cycle. For example 95% of the capacity of the link (which is shared by the traffic allocated to the different queues) may be allocated to the six RDMA queues, with each queue getting a sixth of the 95% (e.g., via a weighted-round-robin scheme with equal weighting). Further, it may be desired to ensure that the switch fabric is not oversubscribed, such that there is enough bandwidth to handle the traffic being communicated via the switch fabric. Traffic from different customers or tenants can be assigned to the same RDMA queue but is differentiated based upon the VLAN ID and/or VNI encoded in the packet.

The switch fabric 640 may use a network control traffic class for underlying IP routing protocol functions (e.g., among the TOR switches). In one example, the plurality of queues of a networking device includes a network control queue to carry Ethernet VPN (EVPN) traffic, which may be used for dissemination of MAC address information across the underlying substrate network and/or for advertising a Virtual Tunnel End Point (VTEP) flood list. These network control protocols (e.g., Border Gateway Protocol (BGP)) may be allocated the highest traffic class. For example, the network control queue may be dedicated to the network control traffic class and implemented as a strict priority queue, such that it is emptied before any of the RDMA queues are serviced. As network control traffic does not consume a lot of network bandwidth, the network control traffic class may be allocated a small amount of the total bandwidth of the plurality of queues.

FIG. 9B shows an example 950 of the plurality of queues of a networking device (e.g., TOR switch 642 or 644, an intermediate switch 646, etc.) that includes four RDMA queues 960-1 to 960-4 and a network control (NC) queue 964. As shown in FIG. 9B, the plurality 950 of queues may also include a dedicated congestion notification (CN) queue 962 to carry CNP packets. Prompt delivery of CNP packets to the sending host is exceptionally critical to successful RDMA congestion management, as the flow control they signal will not occur if they are lost. While the CNP traffic is therefore especially sensitive to packet loss and network latency, it does not require a large amount of network bandwidth. These requirements may be balanced by configuring the CN queue 962 to be a strict priority queue, such that it is emptied before any of the RDMA queues (e.g., queues 960-1 to 960-4) are serviced, but having only a low bandwidth guarantee such that it does not starve the actual RDMA traffic classes. In order to prevent the congestion notification queue 962 from starving the network control queue 964 (e.g., in case of an misconfiguration or other problem that causes an excessive amount of CNP traffic), it may be desired to configure the congestion notification queue 962 to have a lower priority than the network control queue 964.

Additionally or alternatively, the plurality of queues of a network device may also include a scavenger queue for non-RDMA traffic (e.g., other protocols, such as TCP). The "scavenger" traffic class uses the unused network bandwidth without adversely impacting the RDMA traffic classes. The dequeuing logic of the networking device may be configured to service the scavenger queue at a lower priority than the RDMA queues by, for example, assigning it a low weight within the weighted-round-robin scheme (where, e.g., weight is the guaranteed bandwidth). FIG. 9C shows an example 952 of the plurality of queues 950 of a networking device (e.g., TOR switch 642 or 644, an intermediate switch 646, etc.) as described above that also includes a scavenger queue 966.

As described herein, RDMA packets (Layer-2 RDMA packets, or Layer-3 encapsulated packets that carry Layer-2 RDMA packets) carry a QoS value (e.g., in a PCP data field and/or in a DSCP data field) that indicates a priority (e.g., traffic class) for the packet, and enqueuing logic of a networking device may be configured to distribute the incoming packets among a plurality of RDMA queues of the networking device according to their QoS values. For an example in which the PCP data field is used to carry the QoS value and the RDMA packets are distributed among the RDMA queues 960-1 to 960-4 as shown in FIG. 9B, a mapping such as the following may be used: RDMA packets with a PCP value of 6 or 7 are stored to the RDMA queue 960-1, RDMA packets with a PCP value of 4 or 5 are stored to the RDMA queue 960-2, RDMA packets with a PCP value of 2 or 3 are stored to the RDMA queue 960-3, and RDMA packets with a PCP values of 0 or 1 are stored to the RDMA queue 960-4. For an example in which the DSCP data field is used to carry the QoS value and the RDMA packets are distributed among the RDMA queues 960-1 to 960-4 as shown in FIG. 9B, a mapping such as the following may be used: RDMA packets with a DSCP value in the range of from 48 to 64 are stored to the RDMA queue 960-1, RDMA packets with a DSCP value in the range of from 32 to 47 are stored to the RDMA queue 960-2, RDMA packets with a DSCP value in the range of from 16 to 32 are stored to the RDMA queue 960-3, and RDMA packets with a DSCP value in the range of from 0 to 15 are stored to the RDMA queue 960-4. One of skill will recognize that the two mappings described above are merely non-limiting examples, and that a distribution of RDMA packets among a plurality of queues of a networking device may be performed (e.g., by enqueuing logic) according to such a mapping or according to any other mapping of QoS value to RDMA queue.

Deterministic Congestion (e.g., ECN Bits) Marking

In certain embodiments, a deterministic congestion marking scheme is used in which congestion marking is performed on a per-packet basis. Accordingly, for each packet, if a networking device in the switch fabric experiences or detects congestion, the networking device signals that congestion by marking a field of the packet: for example, by marking a ECN bit in the IP header of the Layer-3 encapsulating wrapper of the RoCE packet. As a result, when there is congestion, multiple packets arriving at the destination host machine will have their congestion bit set. In response to each such packet, the destination host machine may send CNP packets. The sender may reduce its transmission rate in response to the CNP packets. The goal is to detect congestion early such that the sender can slow down transmission early, thereby reducing the probability of packet drops or losses.

The architecture of the switch fabric also plays a role in reducing latency for the RoCE packets and for reducing the loss of packets. As described above, the switch fabric may be structured as a Clos network, such as the one depicted in FIG. 5 and described above. For example, in a Clos network with a two-tiered topology with only Tier-0 (TOR switches) and Tier-1 switches (spine switches), a RoCE packet can go from any source host machine to any destination host machine in three hops. Minimizing the number of hops translates to very low latency, which is well suited for RoCE traffic.

In certain embodiments, RDMA traffic belonging to the same flow follows the same path from the source host machine to the destination host machine, since RDMA traffic is sensitive to packet reordering. This flow-based routing avoids a situation that packets arrive out-of-order at the destination host machine. For example, the ingress TOR switch may be configured to distribute the Layer-3 encapsulated packets of multiple flows to the spine switches via a per-flow equal-cost multipath (ECMP) scheme (e.g., an n-way ECMP scheme, where "n" is not to be confused with a number of tiers "n" in a Clos network) to preserve packet order within each flow. The flow to which a packet belongs is generally defined by a combination of the source IP address, destination IP address, source port, destination port, and protocol identifier of the packet (also called a 5-tuple).

Example Infrastructure-as-a-Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
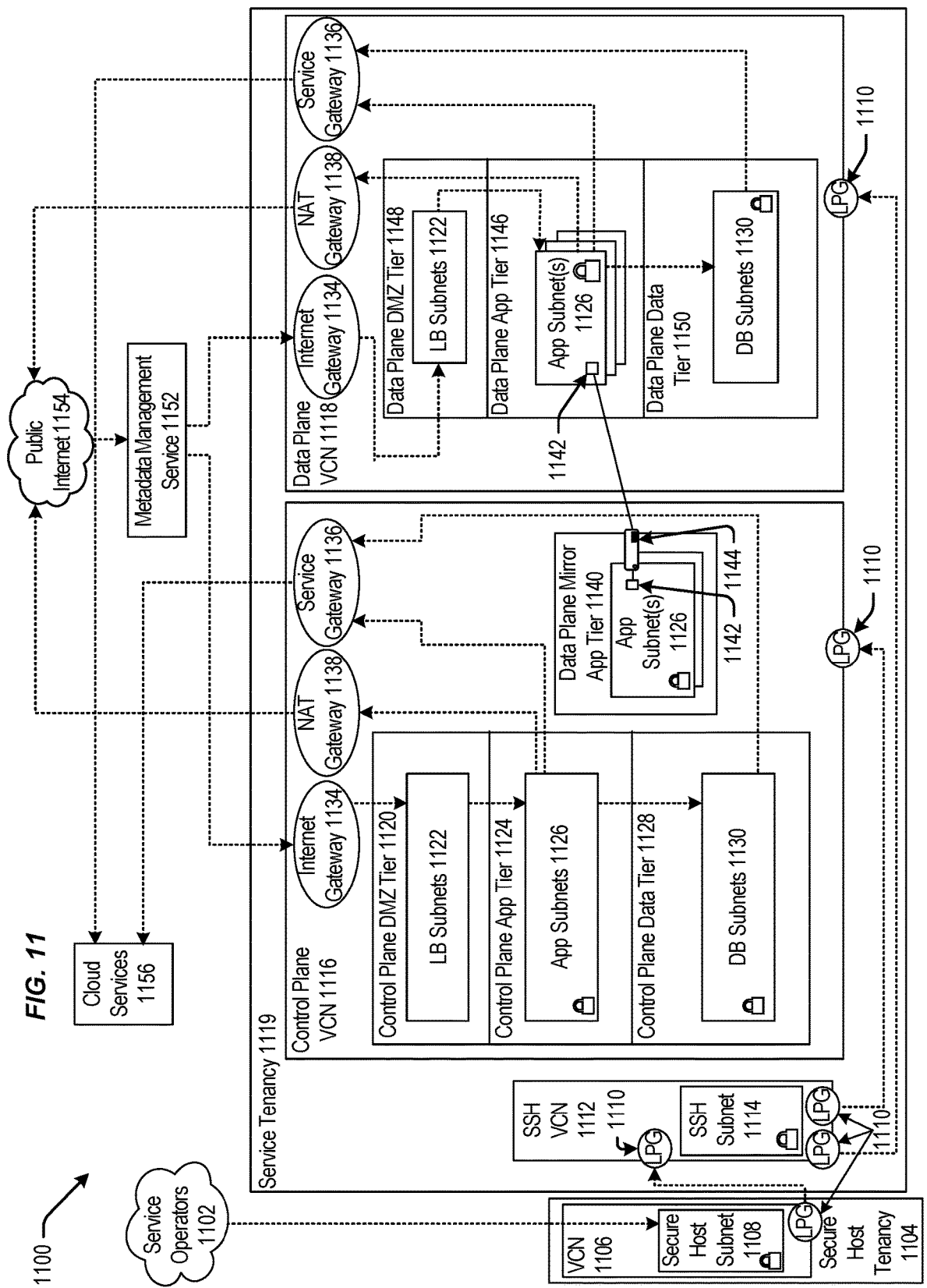
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
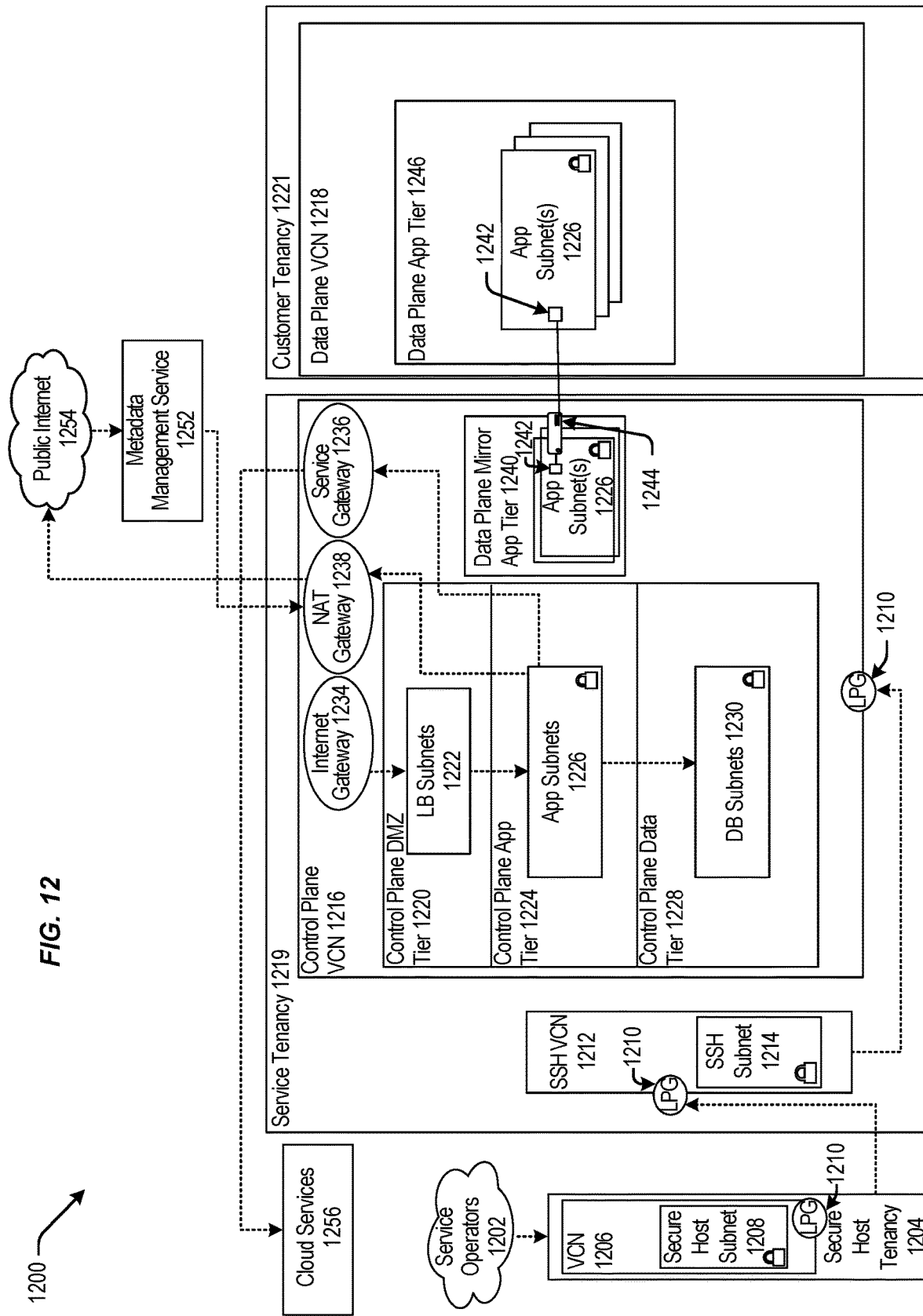
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1102 of FIG. 11) can be communicatively coupled to a secure host tenancy 1204 (e.g. the secure host tenancy 1104 of FIG. 11) that can include a virtual cloud network (VCN) 1206 (e.g. the VCN 1106 of FIG. 11) and a secure host subnet 1208 (e.g. the secure host subnet 1108 of FIG. 11). The VCN 1206 can include a local peering gateway (LPG) 1210 (e.g. the LPG 1110 of FIG. 11) that can be communicatively coupled to a secure shell (SSH) VCN 1212 (e.g. the SSH VCN 1112 of FIG. 11) via an LPG 1110 contained in the SSH VCN 1212. The SSH VCN 1212 can include an SSH subnet 1214 (e.g. the SSH subnet 1114 of FIG. 11), and the SSH VCN 1212 can be communicatively coupled to a control plane VCN 1216 (e.g. the control plane VCN 1116 of FIG. 11) via an LPG 1210 contained in the control plane VCN 1216. The control plane VCN 1216 can be contained in a service tenancy 1219 (e.g. the service tenancy 1119 of FIG. 11), and the data plane VCN 1218 (e.g. the data plane VCN 1118 of FIG. 11) can be contained in a customer tenancy 1221 that may be owned or operated by users, or customers, of the system.

The control plane VCN 1216 can include a control plane DMZ tier 1220 (e.g. the control plane DMZ tier 1120 of FIG. 11) that can include LB subnet(s) 1222 (e.g. LB subnet(s) 1122 of FIG. 11), a control plane app tier 1224 (e.g. the control plane app tier 1124 of FIG. 11) that can include app subnet(s) 1226 (e.g. app subnet(s) 1126 of FIG. 11), a control plane data tier 1228 (e.g. the control plane data tier 1128 of FIG. 11) that can include database (DB) subnet(s) 1230 (e.g. similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g. the service gateway of FIG. 11) and a network address translation (NAT) gateway 1238 (e.g. the NAT gateway 1138 of FIG. 11). The control plane VCN 1216 can include the service gateway 1236 and the NAT gateway 1238.

The control plane VCN 1216 can include a data plane mirror app tier 1240 (e.g. the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152 of FIG. 11) that can be communicatively coupled to public Internet 1254 (e.g. public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
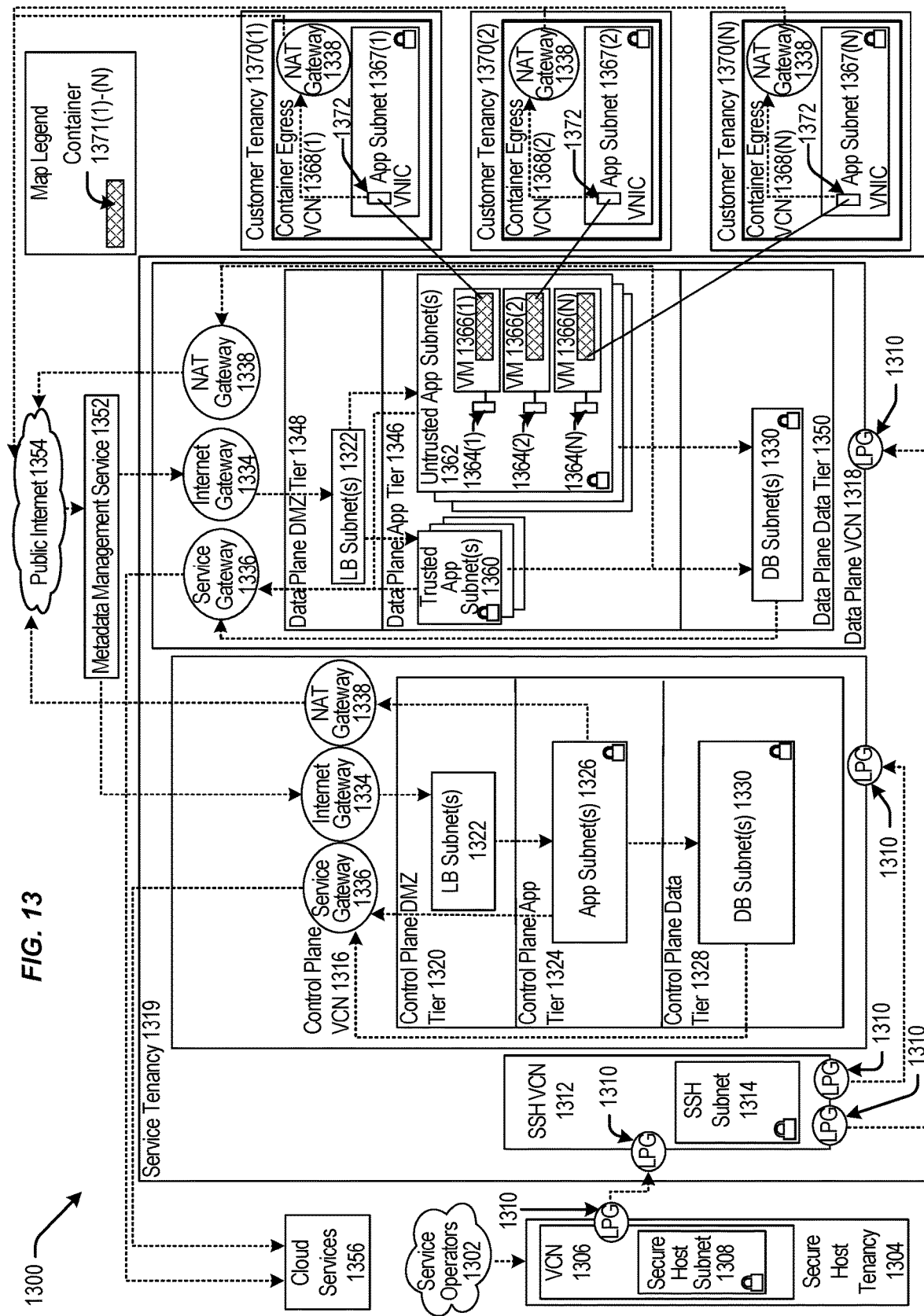
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1102 of FIG. 11) can be communicatively coupled to a secure host tenancy 1304 (e.g. the secure host tenancy 1104 of FIG. 11) that can include a virtual cloud network (VCN) 1306 (e.g. the VCN 1106 of FIG. 11) and a secure host subnet 1308 (e.g. the secure host subnet 1108 of FIG. 11). The VCN 1306 can include an LPG 1310 (e.g. the LPG 1110 of FIG. 11) that can be communicatively coupled to an SSH VCN 1312 (e.g. the SSH VCN 1112 of FIG. 11) via an LPG 1310 contained in the SSH VCN 1312. The SSH VCN 1312 can include an SSH subnet 1314 (e.g. the SSH subnet 1114 of FIG. 11), and the SSH VCN 1312 can be communicatively coupled to a control plane VCN 1316 (e.g. the control plane VCN 1116 of FIG. 11) via an LPG 1310 contained in the control plane VCN 1316 and to a data plane VCN 1318 (e.g. the data plane 1118 of FIG. 11) via an LPG 1310 contained in the data plane VCN 1318. The control plane VCN 1316 and the data plane VCN 1318 can be contained in a service tenancy 1319 (e.g. the service tenancy 1119 of FIG. 11).

The control plane VCN 1316 can include a control plane DMZ tier 1320 (e.g. the control plane DMZ tier 1120 of FIG. 11) that can include load balancer (LB) subnet(s) 1322 (e.g. LB subnet(s) 1122 of FIG. 11), a control plane app tier 1324 (e.g. the control plane app tier 1124 of FIG. 11) that can include app subnet(s) 1326 (e.g. similar to app subnet(s) 1126 of FIG. 11), a control plane data tier 1328 (e.g. the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 11) and a network address translation (NAT) gateway 1338 (e.g. the NAT gateway 1138 of FIG. 11). The control plane VCN 1316 can include the service gateway 1336 and the NAT gateway 1338.

The data plane VCN 1318 can include a data plane app tier 1346 (e.g. the data plane app tier 1146 of FIG. 11), a data plane DMZ tier 1348 (e.g. the data plane DMZ tier 1148 of FIG. 11), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154 of FIG. 11).

The Internet gateway 1334 contained in the control plane VCN 1316 and contained in the data plane VCN 1318 can be communicatively coupled to a metadata management service 1352 (e.g. the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
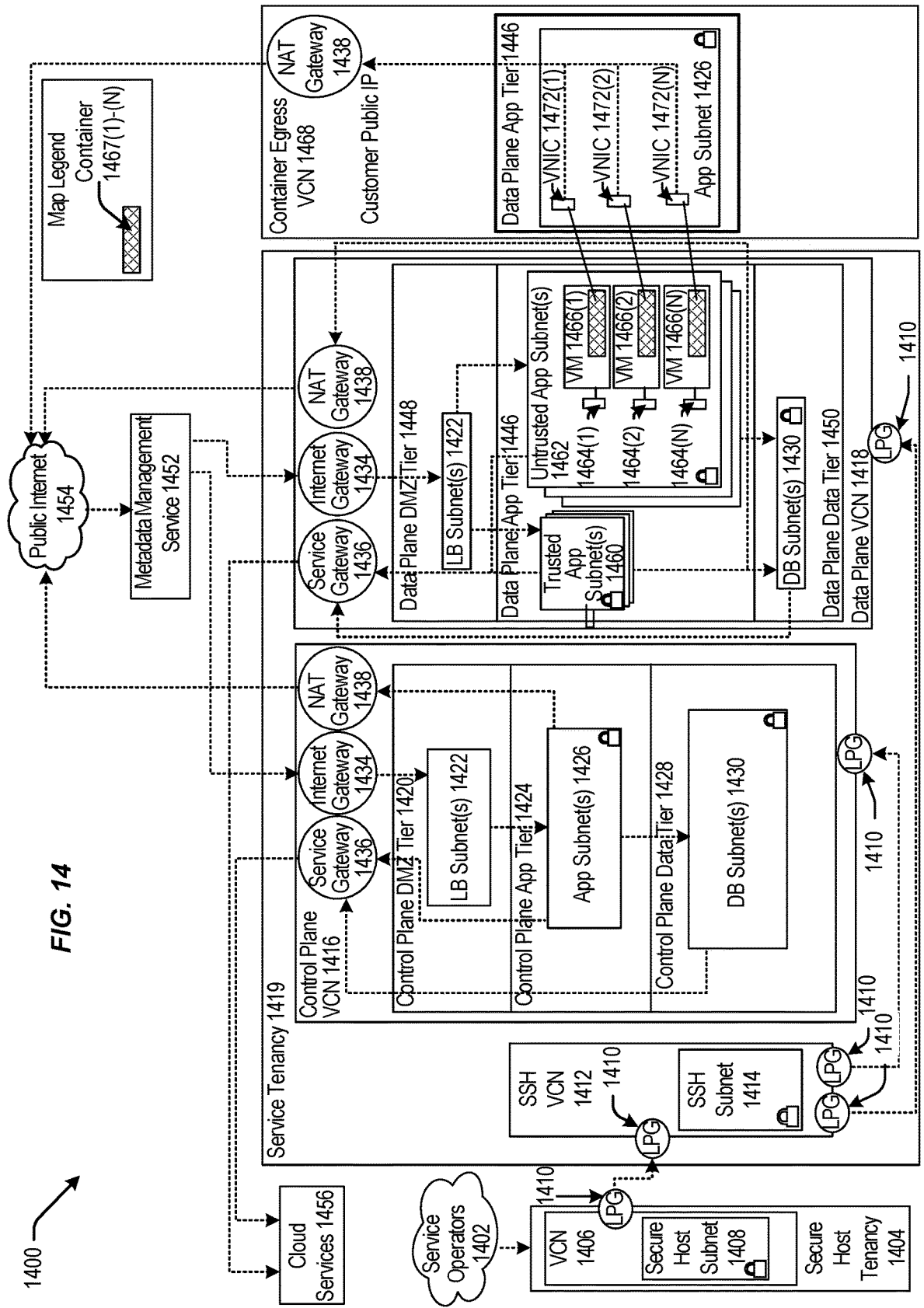
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1102 of FIG. 11) can be communicatively coupled to a secure host tenancy 1404 (e.g. the secure host tenancy 1104 of FIG. 11) that can include a virtual cloud network (VCN) 1406 (e.g. the VCN 1106 of FIG. 11) and a secure host subnet 1408 (e.g. the secure host subnet 1108 of FIG. 11). The VCN 1406 can include an LPG 1410 (e.g. the LPG 1110 of FIG. 11) that can be communicatively coupled to an SSH VCN 1412 (e.g. the SSH VCN 1112 of FIG. 11) via an LPG 1410 contained in the SSH VCN 1412. The SSH VCN 1412 can include an SSH subnet 1414 (e.g. the SSH subnet 1114 of FIG. 11), and the SSH VCN 1412 can be communicatively coupled to a control plane VCN 1416 (e.g. the control plane VCN 1116 of FIG. 11) via an LPG 1410 contained in the control plane VCN 1416 and to a data plane VCN 1418 (e.g. the data plane 1118 of FIG. 11) via an LPG 1410 contained in the data plane VCN 1418. The control plane VCN 1416 and the data plane VCN 1418 can be contained in a service tenancy 1419 (e.g. the service tenancy 1119 of FIG. 11).

The control plane VCN 1416 can include a control plane DMZ tier 1420 (e.g. the control plane DMZ tier 1120 of FIG. 11) that can include LB subnet(s) 1422 (e.g. LB subnet(s) 1122 of FIG. 11), a control plane app tier 1424 (e.g. the control plane app tier 1124 of FIG. 11) that can include app subnet(s) 1426 (e.g. app subnet(s) 1126 of FIG. 11), a control plane data tier 1428 (e.g. the control plane data tier 1128 of FIG. 11) that can include DB subnet(s) 1430 (e.g. DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146 of FIG. 11), a data plane DMZ tier 1448 (e.g. the data plane DMZ tier 1148 of FIG. 11), and a data plane data tier 1450 (e.g. the data plane data tier 1150 of FIG. 11). The data plane DMZ tier 1448 can include LB subnet(s) 1422 that can be communicatively coupled to trusted app subnet(s) 1460 (e.g. trusted app subnet(s) 1360 of FIG. 13) and untrusted app subnet(s) 1462 (e.g. untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154 of FIG. 11).

The Internet gateway 1434 contained in the control plane VCN 1416 and contained in the data plane VCN 1418 can be communicatively coupled to a metadata management service 1452 (e.g. the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
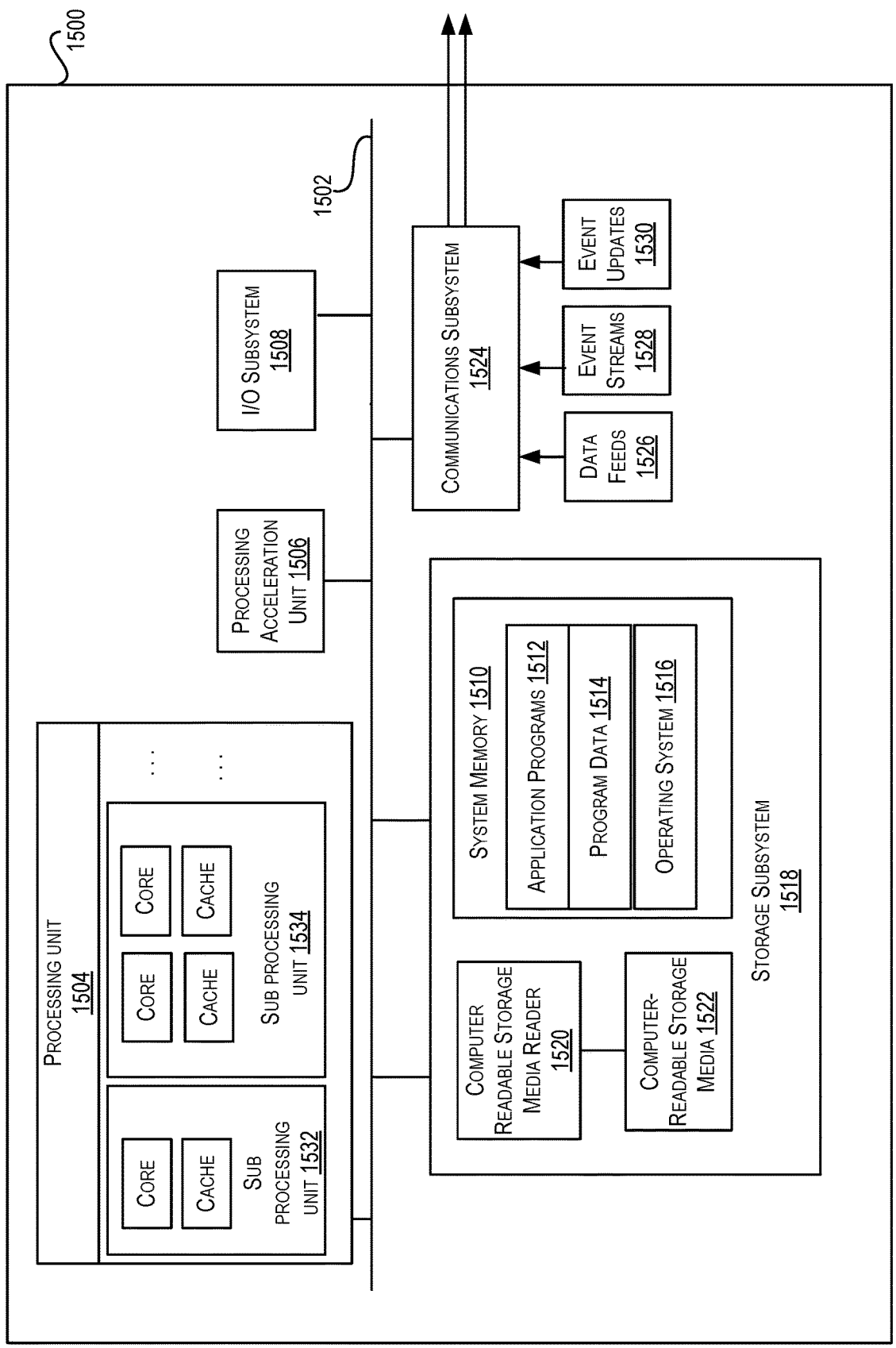
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure.

Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of queuing Remote Direct Memory Access (RDMA) packets, the method comprising:
   by a networking device, receiving a first RDMA packet having a first quality-of-service (QoS) data field and a first virtual local area network (VLAN) identifier, the first VLAN identifier indicating a first VLAN;
   based on a quality-of-service value of the first QoS data field that indicates a class of service for the first RDMA packet, queueing the first RDMA packet in a first RDMA queue of a plurality of queues;
   by the networking device, receiving a second RDMA packet having a second QoS data field and a second VLAN identifier, the second VLAN identifier indicating a second VLAN;
   based on a quality-of-service value of the second QoS data field that indicates a class of service for the second RDMA packet, queueing the second RDMA packet in a second RDMA queue of the plurality of the queues, the second RDMA queue being different than the first RDMA queue;
   by the networking device, receiving a third RDMA packet having a third QoS data field and a third VLAN identifier, the third VLAN identifier indicating a third VLAN that is different than the first VLAN; and
   based on a quality-of-service value of the third QoS data field that indicates a class of service for the third RDMA packet being the same as the quality-of-service value of the first QoS data field that indicates the class of service for the first RDMA packet, queueing the third RDMA packet in the first RDMA queue.

2. The method of claim 1, further comprising retrieving the first RDMA packet from the first RDMA queue, and retrieving the second RDMA packet from the second RDMA queue, according to a first weighting among the plurality of queues.

3. The method of claim 1, further comprising retrieving the first RDMA packet from the first RDMA queue, and retrieving the second RDMA packet from the second RDMA queue, according to a weighted-round-robin scheme.

4. The method of claim 1, wherein the plurality of queues includes a control queue, and wherein the method further comprises, by the networking device, retrieving a plurality of control packets from the control queue,
   wherein the retrieving the plurality of control packets has a strict priority over the retrieving the first RDMA packet and the retrieving the second RDMA packet.

5. The method of claim 4, wherein the plurality of queues includes a plurality of RDMA queues that includes the first RDMA queue and the second RDMA queue, and
   wherein the control queue is configured to have a lower bandwidth than any of the plurality of RDMA queues.

6. The method of claim 4, wherein the plurality of control packets includes at least one of a network control protocol packet or a congestion notification packet.

7. The method of claim 1, wherein the first QoS data field is a Differentiated Services Code Point (DSCP) data field of an Internet Protocol (IP) header of the first RDMA packet.

8. The method of claim 1, wherein each of the first and second RDMA packets is a RoCEv2 packet.

9. The method of claim 1, wherein each of the first and second RDMA packets is a Layer-3 encapsulated packet that is formatted in accordance with an overlay encapsulation protocol.

10. The method of claim 9, wherein the overlay encapsulation protocol is one among VxLAN, NVGRE, GENEVE, STT, and MPLS.

11. The method of claim 9, wherein the method further comprises:
   decapsulating the first RDMA packet to obtain a first decapsulated RDMA packet, and
   copying congestion indication information from at least one outer header of the first RDMA packet to the first decapsulated RDMA packet.

12. The method of claim 1, wherein the method further comprises:
   receiving a plurality of RDMA packets, each of the plurality of RDMA packets having a corresponding QoS data field;
   for each of the plurality of RDMA packets, queuing the RDMA packet in an RDMA queue of the plurality of queues, based on a value of the QoS data field of the RDMA packet that indicates a priority for the RDMA packet; and
   retrieving the plurality of RDMA packets from the plurality of queues,
   wherein the plurality of RDMA packets includes a plurality of packet flows, and
   wherein the method further comprises routing the plurality of packet flows according to a per-flow equal-cost multipath scheme.

13. The method according to claim 1, wherein the third RDMA packet is queued in the first RDMA queue based on the class of service of the third RDMA packet being the same as the class of service of the first RDMA packet.

14. A networking device comprising:
   memory, the memory storing a plurality of queues; and
   processing circuitry coupled with the memory, the processing circuitry to:
   receive a first Remote Direct Memory Access (RDMA) packet having a first quality-of-service (QoS) data field and a first virtual local area network (VLAN) identifier, the first VLAN identifier indicating a first VLAN;
   based on a quality-of-service value of the first QoS data field that indicates a class of service for the first RDMA packet, queue the first RDMA packet in a first RDMA queue of the plurality of queues;
   receive a second RDMA packet having a second QoS data field and a second VLAN identifier, the second VLAN identifier indicating a second VLAN;
   based on a quality-of-service value of the second QoS data field that indicates a class of service for the second RDMA packet, queue the second RDMA packet in a second RDMA queue of the plurality of the queues, the second RDMA queue being different than the first RDMA queue;

receive a third RDMA packet having a third QoS data field and a third VLAN identifier, the third VLAN identifier indicating a third VLAN that is different than the first VLAN; and based on a quality-of-service value of the third QoS data field that indicates a class of service for the third RDMA packet being the same as the quality-of-service value of the first QoS data field that indicates the class of service for the first RDMA packet, queue the third RDMA packet in the first RDMA queue.

15. The networking device of claim 14, wherein the plurality of queues includes a control queue, and wherein the processing circuitry is to retrieve a plurality of control packets from the control queue according to a strict priority over the retrieving the first RDMA packet and the retrieving the second RDMA packet.

16. The networking device of claim 15, wherein each of the first and second RDMA packets is a Layer-3 encapsulated packet that is formatted in accordance with an overlay encapsulation protocol.

17. The networking device of claim 16, wherein the processing circuitry is further to:

decapsulate the first RDMA packet to obtain a first decapsulated RDMA packet, and copy congestion indication information from at least one outer header of the first RDMA packet to the first decapsulated RDMA packet.

18. The networking device of claim 14, wherein the networking device is a switch of a Clos network.

19. A non-transitory computer-readable medium storing a plurality of instructions executable by one or more processors, the plurality of instructions comprising instructions that when executed by the one or more processors cause the one or more processors to:

receive a first RDMA packet having a first quality-of-service (QoS) data field and a first virtual local area network (VLAN) identifier, the first VLAN identifier indicating a first VLAN;

based on a quality-of-service value of the first QoS data field that indicates a class of service for the first RDMA packet, queue the first RDMA packet in a first RDMA queue of a plurality of queues;

receive a second RDMA packet having a second QoS data field and a second VLAN identifier, the second VLAN identifier indicating a second VLAN;

based on a quality-of-service value of the second QoS data field that indicates a class of service for the second RDMA packet, queue the second RDMA packet in a second RDMA queue of the plurality of the queues, the second RDMA queue being different than the first RDMA queue;

receive a third RDMA packet having a third QoS data field and a third VLAN identifier, the third VLAN identifier indicating a third VLAN that is different than the first VLAN; and based on a quality-of-service value of the third QoS data field that indicates a class of service for the third RDMA packet being the same as the quality-of-service value of the first QoS data field that indicates the class of service for the first RDMA packet, queue the third RDMA packet in the first RDMA queue.

20. The non-transitory computer-readable medium of claim 19, wherein the plurality of queues includes a control queue, and wherein the plurality of instructions further comprises instructions that when executed by the one or more processors cause the one or more processors to retrieve a plurality of control packets from the control queue according to a strict priority over the retrieving the first RDMA packet and the retrieving the second RDMA packet.

21. The non-transitory computer-readable medium of claim 19, wherein the first RDMA packet is for a first tenant among a plurality of tenants and the second RDMA packet is for a second tenant among the plurality of tenants, and wherein the first VLAN is a VLAN of a first compute instance among a plurality of compute instances executing on a host machine, and the second VLAN is a VLAN of a second compute instance among the plurality of compute instances.

* * * * *